US012709205B2

(12) United States Patent
Rowe et al.

(10) Patent No.: US 12,709,205 B2
(45) Date of Patent: Aug. 18, 2026

(54) SEAT ACTUATOR CONTROL FOR LUMBAR SUPPORT

(71) Applicant: Toyota Motor Engineering & Manufacturing North America, Inc., Plano, TX (US)

(72) Inventors: Michael Paul Rowe, Pinckney, MI (US); Brian J. Pinkelman, Ann Arbor, MI (US); Yufei Zhu, Ypsilanti, MI (US); Xintong Deng, Belleville, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 18/452,734

(22) Filed: Aug. 21, 2023

(65) Prior Publication Data

US 2025/0065787 A1 Feb. 27, 2025

(51) Int. Cl.
*B60N 2/66* (2006.01)
*B60N 2/02* (2006.01)
*B60N 2/90* (2018.01)

(52) U.S. Cl.
CPC ........... *B60N 2/667* (2015.04); *B60N 2/0244* (2013.01); *B60N 2/976* (2018.02); *B60N 2/0268* (2023.08)

(58) Field of Classification Search
CPC .... B60N 2/0244; B60N 2/0268; B60N 2/667; B60N 2/66–6673; B60N 2/976; F16C 2202/28; F03G 7/0614; F03G 7/06143; F03G 7/06145; F03G 7/06146; F03G 7/06147; F03G 7/0615
See application file for complete search history.

(56) References Cited

U.S. PATENT DOCUMENTS 278,787 A 6/1883 Fannin
1,658,669 A 2/1928 Cohn et al.
1,741,109 A 12/1929 Heimerdinger
1,802,904 A 4/1931 Bryant
2,322,755 A 6/1943 Voorhies
2,327,683 A 8/1943 Warner et al.
(Continued)

FOREIGN PATENT DOCUMENTS

CN 201037277 3/2008
CN 101367433 A 2/2009
(Continued)

OTHER PUBLICATIONS

Pinkelman et al., U.S. Appl. No. 17/729,522, filed Apr. 26, 2022.
(Continued)

*Primary Examiner* — Loren C Edwards
(74) *Attorney, Agent, or Firm* — Christopher G. Darrow; Darrow Mustafa PC

(57) ABSTRACT

One or more actuators can be used to provide a substantially continuous level of lumbar support to a seat occupant. An actuator can be operatively positioned relative to a lumbar region of a seat. The actuator can be caused to morph into an activated configuration to support a lumbar region of a seat occupant. The activated configuration of the actuator can be maintained to provide a substantially continuous level of lumbar support.

19 Claims, 10 Drawing Sheets

(56) References Cited

U.S. PATENT DOCUMENTS 2,508,804 A 5/1950 Schwindt
2,588,706 A 3/1952 Davis
3,394,631 A 7/1968 Thompson
3,527,487 A 9/1970 Payne
3,706,102 A 12/1972 Grenier
4,063,826 A 12/1977 Riepe
4,244,140 A 1/1981 Kim
4,275,561 A 6/1981 Wang
4,396,220 A 8/1983 Dieckmann et al.
4,498,851 A 2/1985 Kolm et al.
4,522,447 A 6/1985 Snyder et al.
4,541,885 A 9/1985 Caudill, Jr.
4,544,988 A 10/1985 Hochstein
4,553,393 A 11/1985 Ruoff
4,595,338 A 6/1986 Kolm et al.
4,779,852 A 10/1988 Wassell
4,780,062 A 10/1988 Yamada et al.
4,806,815 A 2/1989 Homma
4,811,564 A 3/1989 Palmer
4,834,619 A 5/1989 Walton
4,898,426 A 2/1990 Schulz et al.
4,923,000 A 5/1990 Nelson
4,944,755 A 7/1990 Hennequin et al.
4,955,196 A 9/1990 Lin et al.
4,964,402 A 10/1990 Grim et al.
5,069,219 A 12/1991 Knoblich
5,088,115 A 2/1992 Napolitano
5,127,228 A 7/1992 Swenson
5,129,753 A 7/1992 Wesley et al.
5,250,167 A 10/1993 Adolf et al.
5,255,390 A 10/1993 Gross et al.
5,279,123 A 1/1994 Wechsler et al.
5,319,248 A 6/1994 Endou
5,482,351 A 1/1996 Young et al.
5,488,255 A 1/1996 Sato et al.
5,509,923 A 4/1996 Middleman et al.
5,522,712 A 6/1996 Winn
5,583,844 A 12/1996 Wolf et al.
5,619,177 A 4/1997 Johnson et al.
5,622,482 A 4/1997 Lee
5,662,376 A 9/1997 Breuer et al.
5,678,247 A 10/1997 Vickers
5,686,003 A 11/1997 Ingram et al.
5,747,140 A 5/1998 Heerklotz
5,771,742 A 6/1998 Bokaie et al.
5,846,629 A 12/1998 Gwinn
5,853,005 A 12/1998 Scanlon
5,861,703 A 1/1999 Losinski
6,043,978 A 3/2000 Mody et al.
6,053,553 A 4/2000 Hespelt
6,093,910 A 7/2000 McClintock et al.
6,116,257 A 9/2000 Yokota et al.
6,142,563 A 11/2000 Townsend et al.
6,155,716 A 12/2000 Okamura
6,186,047 B1 2/2001 Baruffaldi
6,227,515 B1 5/2001 Broyles
6,326,707 B1 12/2001 Gummin et al.
6,379,393 B1 4/2002 Mavroidis et al.
6,394,001 B1 5/2002 Giesey et al.
6,404,098 B1 6/2002 Kayama et al.
6,422,010 B1 7/2002 Julien
6,443,524 B1 9/2002 Yu
6,450,725 B1 9/2002 Roth et al.
6,481,799 B1 11/2002 Whalen
6,508,437 B1 1/2003 Davis et al.
6,530,217 B1 3/2003 Yokota et al.
6,546,806 B1 4/2003 Varma
6,591,188 B1 7/2003 Ohler
6,628,522 B2 9/2003 Trautman et al.
6,664,718 B2 12/2003 Perline et al.
6,719,694 B2 4/2004 Weng et al.
6,740,994 B2 5/2004 Lee et al.
6,773,535 B1 8/2004 Wetzel
6,809,462 B2 10/2004 Pelrine et al.
6,896,324 B1 5/2005 Kull et al.
6,910,714 B2 6/2005 Browne et al.
6,912,748 B2 7/2005 VanSickle
6,943,653 B2 9/2005 Hanke et al.
6,972,659 B2 12/2005 von Behrens et al.
6,998,546 B1 2/2006 Schmidt et al.
7,017,345 B2 3/2006 Von Behrens et al.
7,086,322 B2 8/2006 Schulz
7,093,903 B2 8/2006 O'Connor et al.
7,100,990 B2 9/2006 Kimura et al.
7,108,316 B2 9/2006 Barvosa-Carter et al.
7,117,673 B2 10/2006 Szilagyi
7,125,077 B2 10/2006 Frank
7,204,472 B2 4/2007 Jones et al.
7,237,847 B2 7/2007 Hancock et al.
7,256,518 B2 8/2007 Gummin
7,293,836 B2 11/2007 Browne et al.
7,306,187 B2 12/2007 Lavan
7,309,104 B2 12/2007 Browne et al.
7,331,616 B2 2/2008 Brei et al.
7,336,486 B2 2/2008 Mongia
7,350,851 B2 4/2008 Barvosa-Carter et al.
7,364,211 B2 4/2008 Niskanen et al.
7,371,052 B2 5/2008 Koeneman
7,446,450 B2 11/2008 Boland et al.
7,448,678 B2 11/2008 Browne et al.
7,476,224 B2 1/2009 Petrakis
7,478,845 B2 1/2009 Mankame et al.
7,484,735 B2 2/2009 Verbrugge et al.
7,501,607 B2 3/2009 Camm et al.
7,506,937 B2 3/2009 Bequet
7,511,402 B2 3/2009 Ito et al.
7,527,312 B1 5/2009 Cucknell et al.
7,556,313 B2 7/2009 Browne et al.
7,578,661 B2 8/2009 Koeneman
7,594,697 B2 9/2009 Browne et al.
7,619,894 B2 11/2009 Wang et al.
7,661,764 B2 2/2010 Ali et al.
7,669,799 B2 3/2010 Elzey
7,709,995 B2 5/2010 Hanlon et al.
7,717,520 B2 5/2010 Boren et al.
7,729,828 B2 6/2010 Gandhi
7,731,279 B2 6/2010 Asada et al.
7,735,940 B2 6/2010 Chiu
7,756,246 B2 7/2010 Mikami et al.
7,758,121 B2 7/2010 Browne et al.
7,766,423 B2 8/2010 Alexander et al.
7,770,391 B2 8/2010 Melz et al.
7,814,810 B2 10/2010 Mitteer
7,823,382 B2 11/2010 Ukpai et al.
7,823,972 B2 11/2010 Browne et al.
7,834,527 B2 11/2010 Rivera et al.
7,878,459 B2 2/2011 Mabe et al.
7,883,148 B2 2/2011 Alexander et al.
7,892,630 B1 2/2011 McKnight et al.
7,901,524 B1 3/2011 McKnight et al.
7,905,538 B2 3/2011 Ukpai et al.
7,905,547 B2 3/2011 Lawall et al.
7,909,403 B2 3/2011 Lawall et al.
7,964,290 B2 6/2011 Mullner et al.
7,965,509 B2 6/2011 Campbell et al.
7,971,296 B2 7/2011 Jansen
7,971,939 B2 7/2011 Fujita et al.
8,016,952 B2 9/2011 Ishida et al.
8,038,215 B2 10/2011 Di Gusto et al.
8,052,112 B2 11/2011 Lawall et al.
8,056,335 B1 11/2011 Brown
8,100,471 B2 1/2012 Lawall et al.
8,109,567 B2 2/2012 Alexander et al.
8,126,615 B2 2/2012 McMillen et al.
8,172,458 B2 5/2012 Petrakis
8,209,976 B2 7/2012 Vaidyanathan et al.
8,240,677 B2 8/2012 Browne et al.
8,313,108 B2 11/2012 Ac et al.
8,362,882 B2 1/2013 Heubel et al.
8,366,057 B2 2/2013 Vos et al.
8,414,366 B2 4/2013 Browne et al.
8,446,475 B2 5/2013 Topliss et al.
8,448,435 B2 5/2013 Gregory et al.
8,510,924 B2 8/2013 Mankame et al.

(56) References Cited

U.S. PATENT DOCUMENTS 8,584,456 B1 11/2013 McKnight
8,585,456 B2 11/2013 Canon
8,593,568 B2 11/2013 Topliss et al.
8,649,242 B2 2/2014 Martin et al.
8,681,496 B2 3/2014 Dede
8,695,334 B2 4/2014 Lewis et al.
8,702,120 B2 4/2014 Kalisz et al.
8,706,305 B2 4/2014 Jiang et al.
8,721,557 B2 5/2014 Chen et al.
8,741,076 B2 6/2014 Gao et al.
8,756,933 B2 6/2014 Topliss et al.
8,793,821 B2 8/2014 Fowkes et al.
8,827,709 B1 9/2014 Gurule et al.
8,830,335 B2 9/2014 Topliss et al.
8,853,916 B2 10/2014 Browne et al.
8,880,141 B2 11/2014 Chen
8,881,347 B2 11/2014 Feinstein
8,894,142 B2 11/2014 Alexander et al.
8,912,709 B2 12/2014 Pollock et al.
8,991,769 B2 3/2015 Gandhi
8,998,320 B2 4/2015 Mankame et al.
9,068,561 B2 6/2015 Gondo
9,086,069 B2 7/2015 Dede
9,140,243 B2 9/2015 Gandhi et al.
9,168,814 B2 10/2015 Gandhi
9,171,686 B2 10/2015 Alacqua et al.
9,180,525 B2 11/2015 Park et al.
9,267,495 B2 2/2016 Kopfer et al.
9,298,207 B2 3/2016 Li
9,347,609 B2 5/2016 Pinto, IV et al.
9,428,088 B1 8/2016 Rajasingham
9,457,813 B2 10/2016 Hoerwick et al.
9,457,887 B2 10/2016 Roe et al.
9,495,875 B2 11/2016 Dowdall et al.
9,512,829 B2 12/2016 Alacqua et al.
9,550,466 B2 1/2017 Gandhi
9,588,020 B2 3/2017 Browne et al.
9,662,197 B2 5/2017 Yun et al.
9,664,182 B2 5/2017 Nicolini et al.
9,664,210 B2 5/2017 Ou et al.
9,684,183 B2 6/2017 Brown et al.
9,696,175 B2 7/2017 Hansen et al.
9,697,708 B2 7/2017 Adrezin et al.
9,714,460 B2 7/2017 Merideth
9,719,534 B2 8/2017 Shevchenko et al.
9,731,828 B2 8/2017 Lichota
9,764,220 B2 9/2017 Keating et al.
9,784,249 B2 10/2017 Li et al.
9,784,590 B2 10/2017 Englehardt et al.
9,827,888 B2 11/2017 Patrick et al.
9,848,814 B2 12/2017 Benson et al.
9,943,437 B2 4/2018 Lowe et al.
9,945,490 B2 4/2018 Dankbaar et al.
9,981,421 B2 5/2018 Macroe et al.
9,994,136 B2 6/2018 Nakada
10,007,263 B1 6/2018 Fields et al.
10,029,618 B2 7/2018 Perez Astudillo et al.
10,059,334 B1 8/2018 Zhu et al.
10,061,350 B2 8/2018 Magi
10,066,829 B2 9/2018 Wong et al.
10,168,782 B1 1/2019 Tchon et al.
10,191,550 B1 1/2019 Nussbaum et al.
10,208,823 B2 2/2019 Kashani
10,299,520 B1 5/2019 Shaffer et al.
10,302,586 B2 5/2019 Sun et al.
10,315,771 B1 6/2019 Rao et al.
10,330,144 B1 6/2019 Alqasimi et al.
10,330,400 B2 6/2019 Dede
10,335,044 B2 7/2019 Banet et al.
10,349,543 B2 7/2019 Sreetharan et al.
10,355,624 B2 7/2019 Majdi et al.
10,371,229 B2 8/2019 Gandhi et al.
10,371,299 B2 8/2019 Leffler
10,377,278 B2 8/2019 Ketels et al.
10,427,634 B2 10/2019 Gandhi et al.
10,434,973 B2 10/2019 Gandhi et al.
10,441,491 B2 10/2019 Wyatt et al.
10,459,475 B2 10/2019 Gandhi et al.
10,479,246 B2 11/2019 Meingast et al.
10,532,672 B1 1/2020 Pinkelman et al.
10,583,757 B2 3/2020 Ketels et al.
10,591,078 B2 3/2020 Oehler et al.
10,647,237 B2 5/2020 Song
10,677,310 B2 6/2020 Gandhi et al.
10,682,931 B2 6/2020 Rowe et al.
10,759,320 B2 9/2020 Mochizuki
10,773,487 B2 9/2020 Frigerio et al.
10,781,800 B2 9/2020 Brown et al.
10,814,514 B2 10/2020 Aihara
10,843,611 B2 11/2020 Caruss et al.
10,933,974 B2 3/2021 Tsuruta et al.
10,960,793 B2 3/2021 Gandhi et al.
10,965,172 B2 3/2021 Dede et al.
10,993,526 B2 5/2021 Vandewall et al.
10,995,779 B2 5/2021 Keplinger et al.
11,048,329 B1 6/2021 Lee et al.
11,091,060 B2 8/2021 Pinkelman et al.
11,125,248 B2 9/2021 Joshi et al.
11,137,045 B2 10/2021 Gandhi et al.
11,180,052 B2 11/2021 Severgnini et al.
11,215,170 B2 1/2022 Zamani et al.
11,241,842 B2 2/2022 Gandhi et al.
11,247,584 B2 2/2022 Breitweg et al.
11,248,592 B1 2/2022 Tsuruta et al.
11,269,891 B2 3/2022 Frank et al.
11,285,844 B2 3/2022 Gandhi et al.
11,353,009 B1 6/2022 Rowe et al.
11,356,255 B1 6/2022 Emelyanov et al.
11,370,330 B2 6/2022 Gandhi et al.
11,372,481 B2 6/2022 Leroy et al.
11,377,007 B2 7/2022 Samain et al.
11,421,664 B1 8/2022 Rowe et al.
11,458,874 B2 10/2022 Nagai et al.
11,460,009 B1 10/2022 Tsuruta et al.
11,460,010 B1 10/2022 Tsuruta et al.
11,467,669 B2 10/2022 Liu et al.
11,472,325 B1 10/2022 Tsuruta et al.
11,486,421 B2 11/2022 Keplinger et al.
11,536,255 B1 12/2022 Rowe
11,541,820 B2 1/2023 Rea et al.
11,542,925 B1 1/2023 Rowe et al.
11,577,471 B2 2/2023 Gandhi et al.
11,585,128 B2 2/2023 Ketels et al.
11,591,076 B2 2/2023 Song et al.
11,592,010 B1 2/2023 Panwar et al.
11,592,037 B1 2/2023 Rowe et al.
11,603,153 B1 3/2023 Trager et al.
11,603,828 B2 3/2023 Gummin et al.
11,624,376 B2 4/2023 Rowe et al.
11,628,898 B1 4/2023 Trager et al.
11,642,083 B2 5/2023 Severgnini et al.
11,649,808 B2 5/2023 Tsuruta et al.
11,668,287 B2 6/2023 Naly et al.
11,680,559 B1 6/2023 Rowe et al.
11,702,015 B2 7/2023 Pinkelman et al.
11,732,735 B2 8/2023 Song et al.
11,750,115 B2 9/2023 Saneyoshi et al.
11,752,901 B2 9/2023 Gandhi et al.
11,795,924 B2 10/2023 Rowe
11,840,161 B2 12/2023 Schmalenberg et al.
11,841,008 B1 12/2023 Panwar et al.
11,885,428 B2 1/2024 Panwar et al.
11,897,379 B2 2/2024 Tsuruta et al.
11,913,436 B2 2/2024 Easton et al.
11,927,206 B2 3/2024 Rowe et al.
2002/0113499 A1 8/2002 Von et al.
2002/0130754 A1 9/2002 Alacqua et al.
2002/0179663 A1 12/2002 Moore et al.
2002/0185932 A1 12/2002 Gummin et al.
2003/0000605 A1 1/2003 Homma
2003/0182041 A1 9/2003 Watson
2004/0035108 A1 2/2004 Szilagyi
2004/0041998 A1 3/2004 Haddad
2004/0104580 A1 6/2004 Spiessl et al.

(56) References Cited

U.S. PATENT DOCUMENTS

2004/0118854 A1 6/2004 Kutun
2004/0145230 A1 7/2004 Fujita et al.
2004/0195888 A1 10/2004 Frye
2004/0256920 A1 12/2004 Gummin et al.
2004/0261411 A1 12/2004 MacGregor
2005/0023086 A1 2/2005 Szilagyi
2005/0066810 A1 3/2005 Schulz
2005/0082897 A1 4/2005 Ropp et al.
2005/0111177 A1 5/2005 Kwitek
2005/0146147 A1 7/2005 Niskanen et al.
2005/0198904 A1 9/2005 Browne et al.
2005/0199455 A1 9/2005 Browne et al.
2005/0199845 A1 9/2005 Jones et al.
2005/0206096 A1 9/2005 Browne et al.
2005/0210874 A1 9/2005 Browne et al.
2005/0211198 A1 9/2005 Froeschle et al.
2005/0227607 A1 10/2005 Stevenson et al.
2005/0253425 A1 11/2005 Asada et al.
2006/0033312 A1 2/2006 Barvosa-Carter et al.
2006/0038643 A1 2/2006 Xu et al.
2006/0038745 A1 2/2006 Naksen et al.
2006/0074325 A1 4/2006 Karo et al.
2006/0201149 A1 9/2006 Biggs et al.
2006/0223637 A1 10/2006 Rosenberg
2006/0226013 A1 10/2006 Decre et al.
2006/0244293 A1 11/2006 Buffa
2006/0265965 A1 11/2006 Butera et al.
2007/0025575 A1 2/2007 Oser et al.
2007/0046074 A1 3/2007 Satta et al.
2007/0063566 A1 3/2007 Browne et al.
2007/0084220 A1 4/2007 Asada et al.
2007/0188004 A1 8/2007 Browne et al.
2007/0205853 A1 9/2007 Taya et al.
2007/0209213 A1 9/2007 Chorpash
2007/0236071 A1 10/2007 Fujita et al.
2007/0246285 A1 10/2007 Browne et al.
2007/0246898 A1 10/2007 Keefe et al.
2007/0246979 A1 10/2007 Browne et al.
2007/0271939 A1 11/2007 Ichigaya
2007/0277877 A1 12/2007 Ghorbal et al.
2008/0006353 A1 1/2008 Elzey et al.
2008/0010912 A1 1/2008 Hanson et al.
2008/0018198 A1 1/2008 Sohn et al.
2008/0085436 A1 4/2008 Langan et al.
2008/0100118 A1 5/2008 Young et al.
2008/0114218 A1 5/2008 Suyama et al.
2008/0219501 A1 9/2008 Matsumoto
2008/0267770 A1 10/2008 Webster et al.
2008/0271559 A1 11/2008 Garscha et al.
2008/0272259 A1 11/2008 Zavattieri et al.
2008/0307786 A1 12/2008 Hafez et al.
2009/0008973 A1 1/2009 Browne
2009/0009656 A1 1/2009 Honda et al.
2009/0030576 A1 1/2009 Periot et al.
2009/0041085 A1 2/2009 Petrakis
2009/0074993 A1 3/2009 Gao et al.
2009/0108607 A1 4/2009 Browne et al.
2009/0115284 A1 5/2009 Liang et al.
2009/0131752 A1 5/2009 Park
2009/0143730 A1 6/2009 De Polo et al.
2009/0173305 A1 7/2009 Alexander et al.
2009/0212158 A1 8/2009 Mabe et al.
2009/0218858 A1 9/2009 Lawall et al.
2009/0224584 A1 9/2009 Lawall et al.
2009/0224587 A1 9/2009 Lawall et al.
2009/0241537 A1 10/2009 Browne et al.
2009/0242285 A1 10/2009 Whetstone, Jr.
2009/0283643 A1 11/2009 Sar et al.
2009/0284059 A1 11/2009 Gupta et al.
2010/0001568 A1 1/2010 Trybus et al.
2010/0027119 A1 2/2010 Kollar et al.
2010/0031525 A1 2/2010 Allezy et al.
2010/0036567 A1 2/2010 Gandhi
2010/0066142 A1 3/2010 Gross et al.
2010/0117663 A1 5/2010 Herrera et al.
2010/0192567 A1 8/2010 Butera
2010/0212312 A1 8/2010 Rudduck
2010/0221124 A1 9/2010 Ikushima et al.
2010/0244505 A1 9/2010 Demick et al.
2010/0275592 A1 11/2010 Topliss et al.
2010/0282902 A1 11/2010 Rajasingham
2010/0287965 A1 11/2010 Bryant
2010/0294476 A1 11/2010 Gomi et al.
2010/0308689 A1 12/2010 Rahman et al.
2010/0326070 A1 12/2010 Hao et al.
2011/0004346 A1 1/2011 Jiang et al.
2011/0017103 A1 1/2011 Lee
2011/0021932 A1 1/2011 Kim et al.
2011/0030380 A1 2/2011 Widdle, Jr. et al.
2011/0038727 A1 2/2011 Vos et al.
2011/0111839 A1 5/2011 Lesley et al.
2011/0120119 A1 5/2011 Alexander et al.
2011/0150669 A1 6/2011 Frayne et al.
2011/0179786 A1 7/2011 Topliss et al.
2011/0179790 A1 7/2011 Pretorius
2011/0217031 A1 9/2011 Eromaki
2011/0300358 A1 12/2011 Blohowiak et al.
2012/0019216 A1 1/2012 Lewis et al.
2012/0049095 A1 3/2012 Yamasaki
2012/0056459 A1 3/2012 Harden
2012/0081337 A1 4/2012 Camp, Jr. et al.
2012/0109025 A1 5/2012 Weinberg et al.
2012/0136126 A1 5/2012 Rousseau
2012/0181896 A1 7/2012 Kornbluh et al.
2012/0232783 A1 9/2012 Calkins et al.
2012/0237309 A1 9/2012 Park et al.
2012/0239183 A1 9/2012 Mankame et al.
2012/0267928 A1 10/2012 Mankame et al.
2012/0276807 A1 11/2012 Cabrera
2012/0292155 A1 11/2012 Gunter
2012/0297763 A1 11/2012 Mankame et al.
2012/0319445 A1 12/2012 Zolno et al.
2013/0005442 A1 1/2013 Erickson et al.
2013/0011806 A1 1/2013 Gao et al.
2013/0043354 A1 2/2013 Shome et al.
2013/0075210 A1 3/2013 Langbein et al.
2013/0098029 A1 4/2013 Pinto, IV et al.
2013/0188313 A1 7/2013 Dede
2013/0205770 A1 8/2013 Browne et al.
2013/0227943 A1 9/2013 Mance et al.
2014/0130491 A1 5/2014 Gandhi et al.
2014/0168894 A1 6/2014 Dede
2014/0196633 A1 7/2014 Shaw
2014/0207333 A1 7/2014 Vandivier et al.
2014/0210240 A1 7/2014 Muck et al.
2014/0217792 A1* 8/2014 Meyer ...................... B60N 2/66
297/354.1
2014/0239677 A1 8/2014 Laib et al.
2014/0250881 A1 9/2014 Yamamoto
2014/0265468 A1 9/2014 Greenhill et al.
2014/0265479 A1 9/2014 Bennett
2014/0277739 A1 9/2014 Kornbluh et al.
2014/0298794 A1 10/2014 Flaschentrager et al.
2014/0314976 A1 10/2014 Niiyama et al.
2014/0316269 A1 10/2014 Zhang et al.
2014/0333088 A1 11/2014 Lang et al.
2014/0338324 A1 11/2014 Jasklowski
2015/0016968 A1 1/2015 Grabowska et al.
2015/0114270 A1 4/2015 Tsuchida
2015/0130220 A1 5/2015 Preisler et al.
2015/0185764 A1 7/2015 Magi
2015/0197173 A1 7/2015 Hulway
2015/0202993 A1 7/2015 Mankame et al.
2015/0274078 A1 10/2015 Alacqua et al.
2015/0289994 A1 10/2015 Engeberg et al.
2015/0290015 A1 10/2015 Elahinia et al.
2015/0331488 A1 11/2015 Grant et al.
2015/0366350 A1 12/2015 DiCenso et al.
2016/0004298 A1 1/2016 Mazed et al.
2016/0032997 A1 2/2016 Seepersad et al.
2016/0061345 A1 3/2016 Jackson, Jr.
2016/0082984 A1 3/2016 Schmidt
2016/0084665 A1 3/2016 Englehardt et al.
2016/0123793 A1 5/2016 Kollich et al.

(56) References Cited

U.S. PATENT DOCUMENTS

2016/0169213 A1 6/2016 Calkins et al.
2016/0221475 A1 8/2016 Sugiyama
2016/0246374 A1 8/2016 Carter et al.
2016/0278459 A1 9/2016 Hilty
2016/0325837 A1 11/2016 Erhel et al.
2016/0339801 A1 11/2016 Pereny et al.
2016/0345088 A1 11/2016 Vilermo et al.
2016/0375459 A1 12/2016 deVilliers et al.
2016/0375835 A1 12/2016 Murray et al.
2017/0116792 A1 4/2017 Jelinek et al.
2017/0121068 A1 5/2017 Foshansky et al.
2017/0123499 A1 5/2017 Eid
2017/0148102 A1 5/2017 Franke et al.
2017/0153707 A1 6/2017 Subramanian et al.
2017/0158104 A1 6/2017 Le et al.
2017/0166222 A1 6/2017 James
2017/0174236 A1 6/2017 Worden et al.
2017/0203432 A1 7/2017 Andrianesis
2017/0240075 A1 8/2017 McCoy et al.
2017/0252260 A1 9/2017 Gummin et al.
2017/0328384 A1 11/2017 Goto et al.
2017/0355288 A1 12/2017 Barbat et al.
2017/0361733 A1 12/2017 Gage
2018/0001113 A1 1/2018 Streeter
2018/0012433 A1 1/2018 Ricci
2018/0036198 A1 2/2018 Mergl et al.
2018/0073491 A1 3/2018 Gissen et al.
2018/0084915 A1 3/2018 Norman et al.
2018/0111511 A1 4/2018 Lota
2018/0115260 A1 4/2018 Chiba et al.
2018/0130347 A1 5/2018 Ricci et al.
2018/0132825 A1 5/2018 Tachibana
2018/0134191 A1 5/2018 Ketels et al.
2018/0141562 A1 5/2018 Singhal
2018/0148007 A1 5/2018 Gage et al.
2018/0149141 A1 5/2018 Cullen et al.
2018/0151035 A1 5/2018 Maalouf et al.
2018/0178808 A1 6/2018 Zhao et al.
2018/0249772 A1 9/2018 Koo et al.
2018/0251234 A1 9/2018 Wang
2018/0264975 A1 9/2018 Bonk et al.
2018/0281621 A1 10/2018 Kaku et al.
2018/0286189 A1 10/2018 Motamedi et al.
2018/0321703 A1 11/2018 Gandhi et al.
2018/0345841 A1 12/2018 Prokhorov et al.
2018/0348759 A1 12/2018 Freeman et al.
2018/0355991 A1 12/2018 Pfahler
2019/0005272 A1 1/2019 Gault et al.
2019/0023161 A1 1/2019 Sullivan et al.
2019/0039525 A1 2/2019 Hu
2019/0041986 A1 2/2019 Rihn et al.
2019/0042857 A1 2/2019 Endo et al.
2019/0059608 A1 2/2019 Yan et al.
2019/0061307 A1 2/2019 Chen et al.
2019/0083022 A1 3/2019 Huang
2019/0135150 A1* 5/2019 Gao .................... B60N 2/7029
2019/0143869 A1 5/2019 Sequi et al.
2019/0154122 A1 5/2019 Lima et al.
2019/0193615 A1 6/2019 Mankame et al.
2019/0197842 A1 6/2019 Long et al.
2019/0232842 A1 8/2019 Boccuccia et al.
2019/0291649 A1 9/2019 Ito
2020/0010001 A1 1/2020 Pinkelman et al.
2020/0015493 A1 1/2020 Ergun et al.
2020/0015593 A1 1/2020 Norman et al.
2020/0032822 A1 1/2020 Keplinger et al.
2020/0079245 A1 3/2020 Rowe et al.
2020/0088175 A1 3/2020 Li et al.
2020/0112269 A1 4/2020 Taghavi et al.
2020/0179168 A1 6/2020 Kelleher et al.
2020/0197250 A1 6/2020 Wyatt et al.
2020/0223325 A1 7/2020 Pinkelman et al.
2020/0226498 A1 7/2020 Jiwani et al.
2020/0238854 A1 7/2020 Gandhi et al.
2020/0247274 A1 8/2020 Gandhi et al.
2020/0276971 A1 9/2020 Takeda et al.
2020/0282878 A1* 9/2020 Gandhi ................ B60N 2/4279
2020/0298732 A1 9/2020 Gandhi et al.
2020/0307416 A1 10/2020 Gandhi et al.
2020/0309102 A1 10/2020 Henderson et al.
2020/0339242 A1 10/2020 Tsuruta et al.
2020/0377036 A1 12/2020 Lee et al.
2020/0378370 A1 12/2020 Kopfer et al.
2021/0038467 A1 2/2021 Van Der Merwe et al.
2021/0095646 A1 4/2021 Blecha et al.
2021/0114553 A1 4/2021 Awtar et al.
2021/0118597 A1 4/2021 Pinkelman et al.
2021/0132396 A1 5/2021 Shin et al.
2021/0153754 A1 5/2021 Ozawa et al.
2021/0161755 A1 6/2021 Le et al.
2021/0162457 A1 6/2021 Eberfors
2021/0221269 A1 7/2021 Baranowski et al.
2021/0236061 A1 8/2021 Severgnini et al.
2021/0237631 A1 8/2021 Muck et al.
2021/0237809 A1 8/2021 Rowe et al.
2021/0265922 A1 8/2021 Nakagawa
2021/0284079 A1 9/2021 Rowe et al.
2021/0312169 A1 10/2021 Pham
2021/0369547 A1 12/2021 Mau et al.
2021/0370499 A1 12/2021 Rowe et al.
2022/0001530 A1 1/2022 Sameoto et al.
2022/0012458 A1 1/2022 Uetabira
2022/0015932 A1 1/2022 Rowe
2022/0015933 A1 1/2022 Rowe
2022/0015971 A1 1/2022 Rowe et al.
2022/0015977 A1 1/2022 Rowe et al.
2022/0017005 A1 1/2022 Rowe et al.
2022/0021314 A1 1/2022 Rowe et al.
2022/0031178 A1 2/2022 Brulet et al.
2022/0063087 A1 3/2022 Rowe
2022/0106941 A1 4/2022 Easton
2022/0119202 A1 4/2022 Morrissey et al.
2022/0154703 A1 5/2022 Shin et al.
2022/0164079 A1 5/2022 Severgnini et al.
2022/0166351 A1 5/2022 Rowe
2022/0176550 A1 6/2022 Rowe
2022/0176551 A1 6/2022 Rowe et al.
2022/0178414 A1 6/2022 Herzog et al.
2022/0196109 A1 6/2022 Gandhi et al.
2022/0196967 A1 6/2022 Dai et al.
2022/0232903 A1 7/2022 Rutledge et al.
2022/0239238 A1 7/2022 Rowe et al.
2022/0242328 A1 8/2022 Pinkelman et al.
2022/0258656 A1 8/2022 Little
2022/0299016 A1 9/2022 Tsuruta et al.
2022/0307485 A1 9/2022 Gummin et al.
2022/0313420 A1 10/2022 Rowe et al.
2022/0314857 A1 10/2022 Tsuruta et al.
2022/0315147 A1 10/2022 Palaniswamy et al.
2022/0316457 A1 10/2022 Rowe et al.
2022/0316458 A1 10/2022 Tsuruta et al.
2022/0321033 A1 10/2022 Rowe et al.
2022/0321034 A1 10/2022 Ebling et al.
2022/0371474 A1 11/2022 Kaku et al.
2022/0412325 A1 12/2022 Köpfer et al.
2023/0000715 A1 1/2023 Rowe
2023/0001572 A1 1/2023 Rowe et al.
2023/0078040 A1 3/2023 Rowe et al.
2023/0088911 A1 3/2023 Song et al.
2023/0119407 A1 4/2023 Sugiyama et al.
2023/0120436 A1 4/2023 Tsuruta et al.
2023/0124526 A1 4/2023 Tsuruta et al.
2023/0136197 A1 5/2023 Gilmore et al.
2023/0179122 A1 6/2023 Palaniswamy et al.
2023/0191953 A1 6/2023 Panwar et al.
2023/0193929 A1 6/2023 Rowe et al.
2023/0249599 A1 8/2023 Nicola et al.
2023/0287871 A1 9/2023 Rowe
2023/0312109 A1 10/2023 Joshi et al.
2023/0331371 A1 10/2023 Gupta et al.
2023/0331372 A1 10/2023 Gupta et al.
2023/0337827 A1 10/2023 Pinkelman et al.

(56) References Cited

U.S. PATENT DOCUMENTS

| | | | |
|---|---|---|---|
| 2024/0060480 | A1 | 2/2024 | Panwar et al. |
| 2024/0097666 | A1 | 3/2024 | Easton et al. |

FOREIGN PATENT DOCUMENTS

| | | | |
|---|---|---|---|
| CN | 101417152 | A | 4/2009 |
| CN | 102333504 | A | 1/2012 |
| CN | 102152309 | B | 11/2012 |
| CN | 103038094 | A | 4/2013 |
| CN | 103147511 | A | 6/2013 |
| CN | 102026842 | B | 7/2013 |
| CN | 103935495 | A | 7/2014 |
| CN | 102765354 | B | 11/2014 |
| CN | 104290617 | A | 1/2015 |
| CN | 204774820 | U | 11/2015 |
| CN | 105517664 | A | 4/2016 |
| CN | 106168523 | A | 11/2016 |
| CN | 107111473 | A | 1/2017 |
| CN | 206029888 | U | 3/2017 |
| CN | 106956254 | A | 7/2017 |
| CN | 105946515 | B | 4/2018 |
| CN | 108100228 | A | 6/2018 |
| CN | 108819806 | A | 11/2018 |
| CN | 106014897 | B | 12/2018 |
| CN | 106956254 | B | 3/2019 |
| CN | 109572966 | A | 4/2019 |
| CN | 209010975 | U | 6/2019 |
| CN | 105003405 | B | 7/2019 |
| CN | 107485536 | B | 1/2020 |
| CN | 112411375 | A | 2/2021 |
| CN | 113119155 | A | 7/2021 |
| CN | 115706489 | A | 2/2023 |
| DE | 19837829 | A1 | 2/2000 |
| DE | 10155119 | A1 | 5/2003 |
| DE | 20309196 | U1 | 11/2003 |
| DE | 10222022 | A1 | 12/2003 |
| DE | 102010021902 | A1 | 12/2011 |
| DE | 102016210214 | A1 | 12/2017 |
| DE | 102019204866 | A1 | 10/2020 |
| DE | 102008021679 | B4 | 1/2021 |
| EP | 1420094 | A1 | 5/2004 |
| EP | 1519055 | A2 | 3/2005 |
| EP | 1904337 | B1 | 10/2010 |
| EP | 2723069 | A1 | 4/2014 |
| EP | 3196484 | A1 | 7/2017 |
| EP | 3858562 | A1 | 8/2021 |
| FR | 3058108 | A1 | 5/2018 |
| JP | S5870892 | U | 5/1983 |
| JP | S61277898 | A | 12/1986 |
| JP | H03276698 | A | 12/1991 |
| JP | H06033895 | A | 6/1994 |
| JP | 09-133069 | A | 5/1997 |
| JP | H09168285 | A | 6/1997 |
| JP | H10337061 | A | 12/1998 |
| JP | 2001293267 | A | 10/2001 |
| JP | 2003276698 | A | 10/2003 |
| JP | 3706899 | B2 | 10/2005 |
| JP | 2006000347 | A | 1/2006 |
| JP | 2006006581 | A | 1/2006 |
| JP | 2006248456 | A | 9/2006 |
| JP | 2008014470 | A | 1/2008 |
| JP | 2008138558 | A | 6/2008 |
| JP | 2008154447 | A | 7/2008 |
| JP | 4273902 | B2 | 6/2009 |
| JP | 2009162233 | A | 7/2009 |
| JP | 2010117457 | A | 5/2010 |
| JP | 4576281 | B2 | 11/2010 |
| JP | 5760241 | | 8/2015 |
| JP | 2017175155 | A | 9/2017 |
| JP | 2018188035 | A | 11/2018 |
| JP | 2019094789 | A | 6/2019 |
| JP | 2019101988 | A | 6/2019 |
| JP | 2019-113578 | A | 7/2019 |
| JP | 2020090181 | A | 6/2020 |
| JP | 2021107221 | A | 7/2021 |
| KR | 19980044089 | U | 9/1998 |
| KR | 20050056526 | A | 6/2005 |
| KR | 1020130005989 | | 1/2013 |
| KR | 101395364 | B1 | 5/2014 |
| KR | 101483560 | B1 | 1/2015 |
| KR | 20170070675 | A | 6/2017 |
| KR | 101861620 | B1 | 4/2018 |
| KR | 1020180074003 | A | 7/2018 |
| KR | 101931791 | B1 | 12/2018 |
| KR | 20210052091 | A | 5/2021 |
| KR | 20210086518 | A | 7/2021 |
| KR | 102298464 | B1 | 9/2021 |
| WO | 9325267 | A1 | 12/1993 |
| WO | 02011648 | A1 | 2/2002 |
| WO | 2005004321 | A1 | 1/2005 |
| WO | 2009079668 | A2 | 6/2009 |
| WO | 2009111362 | A2 | 9/2009 |
| WO | 2011017071 | A2 | 2/2011 |
| WO | 2011111769 | A1 | 9/2011 |
| WO | 2014145018 | A2 | 9/2014 |
| WO | 2014172320 | A1 | 10/2014 |
| WO | 2014191361 | A1 | 12/2014 |
| WO | 2015037600 | A1 | 3/2015 |
| WO | 2015051380 | A2 | 4/2015 |
| WO | 2016017057 | A1 | 2/2016 |
| WO | 2016130719 | A2 | 8/2016 |
| WO | 2017077541 | A1 | 5/2017 |
| WO | 2018080465 | A1 | 5/2018 |
| WO | 2018175741 | A1 | 9/2018 |
| WO | 2019043599 | A1 | 3/2019 |
| WO | 2019097437 | A1 | 5/2019 |
| WO | 2019137048 | A1 | 7/2019 |
| WO | 2019173227 | A1 | 9/2019 |
| WO | 2020110091 | A2 | 6/2020 |
| WO | 2020183360 | A1 | 9/2020 |
| WO | 2020244794 | A1 | 12/2020 |
| WO | 2021118185 | A2 | 6/2021 |
| WO | 2022258952 | A1 | 12/2022 |

OTHER PUBLICATIONS

Rowe et al., U.S. Appl. No. 18/329,217, filed Jun. 5, 2023.

Rowe et al., U.S. Appl. No. 63/485,398, filed Feb. 16, 2023.

Zhu et al., U.S. Appl. No. 18/172,637, filed Feb. 22, 2023.

Pinkelman et al., U.S. Appl. No. 18/452,343, filed Aug. 18, 2023.

Pinkelman et al., U.S. Appl. No. 18/452,376, filed Aug. 18, 2023.

Rowe et al., U.S. Appl. No. 18/453,395, filed Aug. 22, 2023.

Rowe et al., U.S. Appl. No. 18/452,602, filed Aug. 21, 2023.

Jani et al., "A review of shape memory alloy research, applications, and opportunities", Elsevier, 2014, pp. 1078-1113 (36 pages).

Tiseo et al., "A Shape Memory Alloy Based Tuneable Dynamic Vibration Absorber for Vibration Tonal Control", Journal of Theoretical and Applied Mechanics, 2010, pp. 135-153 (19 pages).

Williams et al., "Dynamic modelling of a shape memory alloy adaptive tuned vibration absorber", Elsevier, Journal of Vibration and Sound, 2005, pp. 211-234 (24 pages).

Araki et al., "Integrated mechanical and material design of quasi-zero-stiffness vibration isolator with superelastic Cu—Al—Mn shape memory alloy bars", Journal of Sound and Vibration, 2015 (34 pages).

Casciati et al., "Performance of a base isolator with shape memory alloy bars", Earthquake Engineering and Engineering Vibration, Dec. 2007 (8 pages).

Correa et al., "Mechanical Design of Negative Stiffness Honeycomb Materials", Integrating Materials and Manufacturing Innovation, 4:10, pp. 1-11, 2015 (11 pages).

Ferguson-Pell, "Seat Cushion Selection", J. Rehab. Res. Dev., Special Supplement #2, 23(3), pp. 49-73, 1986 (25 pages).

Miga Motor Company, "Miga AdrenaLine—A Space Age Wire," retrieved from the Internet: <https://migamotors.com/index.php?main_page=product_info&cPath=1&products_id=37>, [retrieved Mar. 26, 2021] (1 page).

Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).

(56) References Cited

OTHER PUBLICATIONS

Endragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl, No. 18/399,026, filed Dec. 28, 2023.
Zhu et al., U.S. Appl. No. 18/399,075, filed Dec. 28, 2023.
International Search Authority, International Search Report and Written Opinion for International Application No. PCT/US2024/042991 mailed on Nov. 26, 2024, 2024 (10 pages).
Song et al., "Resistance Modelling of SMA Wire Actuators", Canadian Institute for NDE, International Workshop: Smart Materials, Structures & NDT in Aerospace Conference, Nov. 2011 (10 pages).
Motzki, "Efficient SMA Actuation—Design and Control Concepts", Proceedings, vol. 64, No. 1, MDPI, 2020 (9 pages).
Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).
Spiess, "#321 7 Sensors tested: Measuring Current with Microcontrollers (Arduino, ESP32, ESP8266)", uploaded on Apr. 5, 2020 by user "Andreas Spiess" accessible via the Internet: <https://www.youtube.com/watch?V=cG8moaufmQs>.
Ou et al., "jamSheets: Thin Interfaces with Tunable Stiffness Enabled by Layer Jamming," Proceedings of the 8th International Conference on Tangible, Embedded, and Embodied Interaction, 2014 (8 pages).
Ou et al., "aeroMorph—Heat-sealing Inflatable Shape-change Materials for Interaction Design," Proceedings of the 29th Annual Symposium on User Interface Software and Technology (2016) pp. 121-132 (10 pages).
Rowe et al., U.S. Appl. No. 18/468,029, filed Sep. 15, 2023.
Barbarino et al., "A review on shape memory alloys with applications to morphing aircraft", Smart Materials and Structures, Apr. 2014 (19 pages).
"HapWRAP: Soft Growing Wearable Haptic Device", retrieved from the Internet: <https://smartdevicess.createdsites.com>, dated May 27, 2019 (18 pages).
Yilmaz et al., "Detecting Vital Signs with Wearable Wireless Sensors", Sensors, Dec. 2010 (26 pages).
Choi et al. "Highly conductive, stretchable, and biocompatible Ag—Au core-sheath nanowire composite for wearable and implantable bioelectronics", Nature Nanotechnology 13, No. 11, 2018 (36 pages).
Gao et al., "Wearable Microfluidic Diaphragm Pressure Sensor for Health and Tactile Touch Monitoring", Advanced Materials, Oct. 2017 (15 pages).
Kweon et al., "Wearable high-performance pressure sensors based on three-dimensional electrospun conductive nanofibers", NPG Asia Materials 2018 (12 pages).
Wang et al. "Monitoring of the central blood pressure waveform via a conformal ultrasonic device", Nat Biomed Eng, Sep. 2018 (22 pages).
Agharese et al. "hapWRAP: Soft Growing Wearable Haptic Device", 2018 IEEE International Conference on Robotics and Automation (ICRA), May 2018 (7 pages).
Gao et al., "Fully integrated wearable sensor arrays for multiplexed in situ perspiration analysis", Nature, Jan. 2016 (30 pages).
Jitosho et al. "Exploiting Bistability for High Force Density Reflexive Gripping", 2019 International Conference on Robotics and Automation (ICRA), May 2019 (7 pages).
Wikipedia, "Slap bracelet", retrieved from the Internet: <https://en.wikipedia.org/wiki/Slap_bracelet>, [retrieved Mar. 12, 2021] (2 pages).
Maffiodo et al. "Three-Fingered Gripper with Flexure Hinges Actuated by Shape Memory Alloy Wires", Int. J. of Automation Technology, vol. 11, No. 3, pp. 355-360, 2017 (6 pages).
Buckner et al. "Roboticizing fabric by integrating functional fibers", Proceedings of the National Academy of Sciences, Oct. 2020 (10 pages).
Blain, "Refrigerants not required: Flexible metal cooling prototype demonstrates extreme efficiency", retrieved from the Internet: <https://newatlas.com/shape-memory-alloy-nitinol-heating-cooling/58837/> [retrieved Apr. 1, 2024], dated Mar. 13, 2019 (13 pages).
Taniguchi, "Flexible Artificial Muscle Actuator Using Coiled Shape Memory Alloy Wires", APCBEE Procedia 7, pp. 54-59, May 2013 (6 pages).
Acome et al., "Hydraulically amplified self-healing electrostatic actuators with muscle-like performance", Science 359, pp. 61-65, 2018 (5 pages).
Wang et al., "Recent Progress in Artificial Muscles for Interactive Soft Robotics", Advanced Materials, vol. 33, Issue 19, published Oct. 27, 2020 (48 pages).
Liang et al., "Comparative study of robotic artificial actuators and biological muscle", Advances in Mechanical Engineering, 2020 (25 pages).
El-Atab et al., "Soft Actuators for Soft Robotic Applications: A Review", Advanced Intelligent Systems 2020 (37 pages).
Pagoli et al., "Review of soft fluidic actuators: classification and materials modeling analysis", Smart Materials and Structures, vol. 31, 2021 (31 pages).
Park et al., "A Novel Fabric Muscle Based on Shape Memory Alloy Springs", Soft Robotics, vol. 7, No. 3, 2020 (11 pages).
Ebay, "Cardboard Dividers 5 Sets 7.5"×10.5"×4" High 12 cell", retrieved from the Internet: <https://www.ebay.com itm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., "Bistable Buckled Beam: Modeling of Actuating Force and Experimental Validations", Journal of Mechanical Design, 2009 (10 pages).
Cazottes et al., "Design of Actuation for Bistable Structures Using Smart Materials," Advances in Science and Technology, vol. 54, pp. 287-292, 2008 (1st Page/Abstract only).
Cazottes et al, "Actuation of bistable buckled beams with Macro-Fiber Composites," IEEE/RSJ International Conference on Intelligent Robots and Systems, pp. 564-569, 2008 (7 pages).
Haines et al., "New Twist on Artificial Muscles," Proceedings of the National Academy of Sciences, vol. 113, No. 42, pp. 11709-11716, Oct. 18, 2016 (9 pages).
Inoue et al., "High-performance structure of a coil-shaped soft-actuator consisting of polymer threads and carbon nanotube yarns," AIP Advances 8, 2018, (8 pages).
Abbas et al., "A Physics Based Model for Twisted and Coiled Actuator" 2017 IEEE International Conference on Robotics and Automation (ICRA), pp. 6121-6126, 2017 (6 pages).
Haines et al., "Artificial Muscles from Fishing Line and Sewing Thread" (Supplementary Materials) Science 343, 868, 2014 (36 pages).
Yip et al., "On the Control and Properties of Supercoiled Polymer Artificial Muscles," IEEE Transactions on Robotics 2017 (11 pages).

(56) References Cited

OTHER PUBLICATIONS alibaba.com, "Hangzhou Phase Change Technology Co., Ltd", Retrieved from the Internet: <https://hzfeijie.en.alibaba.com/product/1448845650-220286736/phase_change_material_PCM_balls.html#!>, [Retrieved May 2, 2017] (3 pages).
Goodfellow Corporation, "New to Our Range: A Magnetic Shape Memory Alloy that Converts Magnetic Field Energy into Kinetic Energy," <retrieved from the Internet: http://www.goodfellowusa.com/corporate/news/US/June-2011/us.htm> [retrieved Jan. 23, 2012] (2 pages).
Goodfellow Corporation, "Magnetic Shape Memory Material", <retrieved from the Internet: http://www.goodfellowusa.com/larger-quantities/alloys/magnetic-shape-memory-material/> [retrieved Jan. 23, 2012] (3 pages).
Sherrit et al., "Planar Rotary Motor using Ultrasonic Horns", Proc. SPIE 7981, Sensors and Smart Structures Technologies for Civil, Mechanical, and Aerospace Systems 2011, 798100, Apr. 13, 2011 (8 pages).
Henry, "Dynamic Actuation Properties of Ni—Mn—Ga Ferromagnetic Shape Memory Alloys", submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Rowe et al., U.S. Appl. No. 18/178,302, filed Mar. 3, 2023.
Lee et al. "Long Shape Memory Alloy Tendon-based Soft Robotic Actuators and Implementation as a Soft Gripper" Scientific Reports, Aug. 2, 2019 (12 pages).
Saga et al. "Development of artificial muscle actuator reinforced by Kevlar fiber", 2002 IEEE International Conference on Industrial Technology, Jan. 2002 (5 pages).
Wikipedia contributors. (Oct. 16, 2022). Swaged sleeve. In Wikipedia, The Free Encyclopedia. Retrieved 14:36, Aug. 14, 2025, from https://en.wikipedia.org/w/index.php?title=Swaged_sleeve&oldid=1116368722 (Year: 2022), (2 pages).
Wu et al., "Effect of Polyurethane Coating on Mechanical Response of Shape Memory Alloy Wires." Smart Materials and Structures, IOP Science, Sep. 14, 2023, iopscience.iop.org/article/10.1088/1361-665X/acf69c. Accessed Nov. 21, 2025 (11 pages).
JZK "JZK 2 Mm X 30 M 98 Ft Plastic-Coated Thin Stainless Steel Wire Rope Cable: Amazon.de: Business, Industry & Science." Amazon.de, Nov. 11, 2020, www.amazon.de/-/en/Plastic-Coated-Stainless-Sleeves-Picture-Hanging/dp/B08N6837B9. Ace (Year: 2020) (6 pages).

* cited by examiner

300

600
640
610
680
620
695
650
690

SEAT ACTUATOR CONTROL FOR LUMBAR SUPPORT

FIELD

The subject matter described herein relates in general to seats and, more particularly, to seats that provide a haptic effect.

BACKGROUND

A vehicle typically includes a plurality of seats. There are numerous vehicle seat designs. Vehicle seats can be contoured and/or can include features to provide support and comfort to a vehicle occupant. Some vehicle seats can include various ergonomic features to enhance user comfort. Some vehicle seats can provide a haptic effect to a user. Further, lumbar support pillows can be used to facilitate comfortable and ergonomic seating.

SUMMARY

In one respect, the present disclosure is directed to a system for seat actuation. The system can include a seat and an actuator operatively positioned relative to a lumbar region of the seat. The system can include one or more processors operatively connected to the actuator. The one or more processors can be configured to cause the plurality of actuators to morph into an activated configuration to support a lumbar region of a seat occupant. The one or more processors can be configured to maintain the activated configuration of the actuator. Thus, a substantially continuous level of lumbar support is provided to the seat occupant.

In another respect, the present disclosure is directed to a seat actuation method for lumbar support. An actuator can be operatively positioned relative to a lumbar region of a seat. One or more processors can be operatively connected to the actuator. The method can include causing the actuator to morph into an activated configuration to support a lumbar region of a seat occupant. The method can include maintaining the activated configuration of the actuator. Thus, a substantially continuous level of lumbar support is provided to the seat occupant.

DETAILED DESCRIPTION

Figure 1:
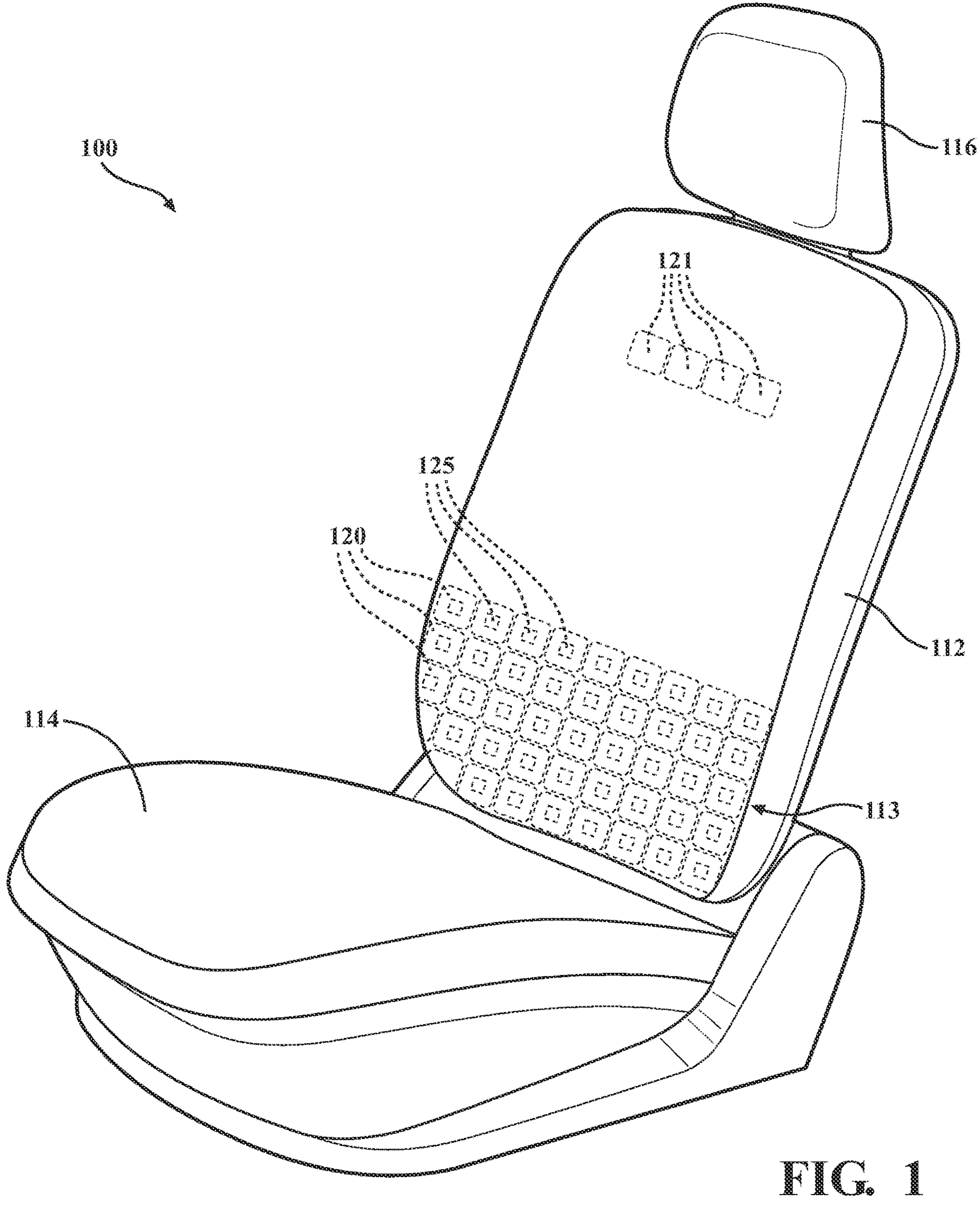
FIG. 1 is an example of a seat.

While lumbar support pillows can provide some level of support to a user, they cannot adjust for changes in position of a seat occupant and/or in the seat itself. According to arrangements described herein, actuators can be used to provide a substantially continuous level of lumbar support to a seat occupant. One or more actuators can be operatively positioned relative to a lumbar region of a seat. The one or more actuators can be caused to morph into an activated configuration to support a lumbar region of a seat occupant. The activated configuration of the actuators can be maintained to provide a substantially continuous level of lumbar support. In some arrangements, there can also be one or more actuators operatively positioned relative to a non-lumbar region of the seat. In some arrangements, such actuator(s) can provide a different sensation to the seat occupant than the actuator(s) operatively positioned relative to the lumbar region.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a seat 100 is shown. In one or more arrangements, the seat 100 can be a vehicle seat. The seat 100 can be any type of vehicle seat, now known or later developed. The seat 100 can be for any vehicle occupants, such as for a driver and/or for a passenger. The seat will be described herein with respect to a vehicle seat, but it will be appreciated that arrangements are not limited to vehicle seats. Indeed, the seat 100 can be an office chair, a chair, a massage chair, a gaming chair, a recliner, or any other seat structure, now known or later developed.

The seat 100 can have any suitable configuration. For instance, the seat 100 can include a back portion 112 and a seat portion 114. The back portion 112 and/or the seat portion 114 can include bolsters. In some arrangements, the seat 100 can include a headrest 116 and/or arm rests.

The seat 100 can include one or more actuators. The one or more actuators can be operatively positioned relative to one or more surfaces or portions of the seat 100. The one or more surfaces can be a surface of the back portion 112, the seat portion 114, a bolster of the back portion 112, a bolster of the seat portion 114, the headrest 116, an arm rest, or any combination or subset thereof.

In some arrangements, there can be a single actuator associated with the seat. In other arrangements, there can be a plurality of actuators associated with the seat 100. When actuated, the one or more actuators can cause the surface(s) or portion(s) of the seat 100 to morph into a different configuration and/or the one or more actuators can provide a physical sensation to a portion of a seat occupant's body that is in operative contact with the seat 100. "Operative contact" includes direct contact as well as indirect contact, such as through the seat 100 (e.g., upholstery, padding, cushioning, etc.) or the clothing of a seat occupant.

The actuator(s) can be operatively positioned relative to the seat 100. "Operatively positioned relative to" means that the actuators are positioned in a location that, when activated, provides a physical sensation to a person sitting in the seat 100. In one or more arrangements, the actuator(s) 120 can be located within a portion of the seat 100. For instance, the actuator(s) 120 can be located within the back portion 112, the seat portion 114, the bolster of the back portion 112, the bolster of the seat portion 114, the headrest 116, one or more arm rests, or any combination or subset thereof.

In one or more arrangements, one or more actuators 120 can be located in a lumbar region 113 of the back portion 112. In this context, "lumbar region" means a portion of the seat that would correspond to at least a portion of the lumbar region of a seat occupant's back. The actuator(s) 120 may be interchangeably referred to herein as first actuator(s) 120.

In arrangements in which there is a plurality of actuators 120, the plurality of actuators 120 can be substantially identical to each other. Alternatively, one or more of the actuators 120 can be different from the other actuators 120 in one or more respects, such as size, shape, configuration, actuation effect, etc. The plurality of actuators 120 can be distributed in any suitable manner with respect to the lumbar region 113 of the seat 100. In some instances, the plurality of actuators 120 can be arranged in rows and columns. In such instances, the actuators 120 in a row or in a column can be adjacent to each other. Alternatively, there can be a spacing between at least some of the actuators 120 in the row or column. In some instances, the plurality of actuators 120 can be arranged in a plurality of discrete areas, which may or may not be spaced apart.

When there is a plurality of rows of the actuators 120, the rows can, in some arrangements, have the same quantity of actuators, types of actuators, distribution of actuations, arrangement of actuators, or other aspect. However, in other arrangements, when there is a plurality of rows of actuators 120, the rows can be different from each other in one or more respects, including any of those noted herein. The plurality of rows of the actuators 120 can be adjacent to each other. Alternatively, the rows of the actuators 120 can be spaced apart.

When there is a plurality of columns of the actuators 120, the columns can, in some arrangements, have the same quantity of actuators, types of actuators, distribution of actuations, arrangement of actuators, or other aspect. However, in other arrangements, when there is a plurality of columns of actuators 120, the columns can be different from each other in one or more respects, including any of those noted herein. The columns of the actuators 120 can be adjacent to each other. Alternatively, the columns of the actuators 120 can be spaced apart.

In some arrangements, there can be a single actuator 120 operatively positioned relative to the lumbar region 113. The single actuator 120 can be provided in any suitable location. In some instances, the single actuator 120 can span a portion of the width of the lumbar region 113. In some instances, the single actuator 120 can span at least a majority of the width of the lumbar region 113. In some instances, the single actuator 120 can span the entire width of the lumbar region 113. In some instances, the single actuator 120 can span a portion of the height of the lumbar region 113. In some instances, the single actuator 120 can span a majority of the height of the lumbar region 113. In some instances, the single actuator 120 can span the entire height of the lumbar region 113. In some arrangements, the single actuator 120 operatively positioned relative to the lumbar region 113 can be the only actuator associated with the seat 100.

In some arrangements, a plurality of actuators 120 can be operatively positioned relative to the lumbar region 113. The plurality of actuators 120 can be provided in any suitable location. In some instances, the plurality of actuators 120 can span a portion of the width of the lumbar region 113. In some instances, the plurality of actuators 120 can span a majority of the width of the lumbar region 113. In some instances, the plurality of actuators 120 can span the entire width of the lumbar region 113. In some instances, the plurality of actuators 120 can span a portion of the height of the lumbar region 113. In some instances, the plurality of actuators 120 can span a majority of the height of the lumbar region 113. In some instances, the plurality of actuators 120 can span the entire height of the lumbar region 113. In some arrangements, the plurality of actuators 120 operatively positioned relative to the lumbar region 113 can be the only actuators associated with the seat 100.

In some arrangements, there can be one or more actuators 121 located in one or more non-lumbar regions of the seat 100. The actuator(s) 121 may be referred to interchangeably herein as the second actuator(s) 121. "Non-lumbar regions" can include the seat portion 114, the bolster of the back portion 112, the bolster of the seat portion 114, the headrest 116, one or more arm rests, and/or any portion of the back portion 112 outside of the lumbar region 113. While a plurality of the second actuator 121 are shown in FIG. 1, it will be understood that there can be a single second actuator 121 located in non-lumbar regions of the seat 100, or there can be additional second actuators 121. The second actuator(s) 121 are not limited to the location or quantity shown in FIG. 1. The above discussion of the first actuator(s) 120 generally applies to the second actuator(s) 121; however, the second actuator(s) 121 are not operatively positioned with respect to the lumbar region 113 of the seat 100.

As will be described in more detail, one or more of the actuator(s) 120 in the lumbar region 113 can be activated. The activated actuator(s) 120 can remain in an activated condition to provide lumbar support to a seat occupant.

The actuator(s) 120 and the actuator(s) 121 can be any element or combination of elements operable to modify, adjust and/or alter one or more surfaces or portions of the seat 100. In FIG. 1, the actuator(s) 120 and the actuator(s) 121 are generally represented by a rectangular feature. It will be understood that the actuator(s) 120 can be any suitable type of actuator, now known or later developed.

In some arrangements, the actuator(s) 120 and the actuator(s) 121 can be substantially identical to each other. In other arrangements, the actuator(s) 120 and the actuator(s) 121 can be different from each other in one or more respects, including in any respect described herein.

In some arrangements, the actuator(s) 120 can include a contracting member. When an activation input is provided to the contracting member, the contracting member can contract, thereby causing the actuator 120 to morph into an activated configuration in which a dimension (e.g., the height) of the actuator increases. In some arrangements, the contracting member can be a shape memory material member, which can include shape memory alloys and shape memory polymers. As an example, the contracting member can be a shape memory alloy wire. Various non-limiting examples of suitable actuators are shown in FIGS. 6-8, and they will be described in greater detail herein. In some instances, the actuator(s) 121 can include a contracting member.

The phrase "shape memory material" includes materials that change shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members can be shape memory material wires. As an example, the shape memory material members can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 150 MPa to about 400 MPa. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynalloy, Inc., Irvine, California. As a further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order to provide heat generated by electrical resistance, in order to change a phase or crystal structure transformation (i.e., twinned martensite, detwinned martensite, and austenite) resulting in a lengthening or shortening of the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material members are described, in some implementations, as being wires, it will be understood that the shape memory material members are not limited to being wires. Indeed, it is envisioned that suitable shape memory materials may be employed in a variety of other forms, such as sheets, plates, panels, strips, cables, tubes, or combinations thereof. In some arrangements, the shape memory material members may include an insulating coating.

In some arrangements, the actuator(s) 120 and the second actuator(s) 121 can be substantially the same actuators. However, in other arrangements, the actuator(s) 120 and the second actuator(s) 121 can be different from each other in one or more respects.

In one or more arrangements, the seat 100 can include one or more sensors 125. In some arrangements, the sensor(s) 125 can be operatively positioned with respect to a respective one of the actuator(s) 120. The sensor(s) 125 can be part of a feedback control loop for the actuator(s) 120. For instance, the sensor(s) 125 can be used to help maintain the actuator(s) 120 in a particular condition, state, or configuration. In some arrangements, the sensor(s) 125 can be configured to detect, directly or indirectly, changes in the force applied to the lumbar region of a seat occupant.

In one or more arrangements, the sensor(s) 125 can be flex sensors. The flex sensors can be any suitable type of flex sensor, now known or later developed. The flex sensors can be configured to change resistance when flexed. The flex sensors can be operatively positioned with respect to the actuator(s) 120. In some instances, the flex sensors can be operatively positioned on or within the actuator(s) 120. Thus, when an actuator 120 is activated or deactivated such that it morphs, the morphing of the actuator 120 can act upon the flex sensor so as to change resistance, which can be used to determine changes in a level of lumbar support provided to a seat occupant.

In one or more arrangements, the sensor(s) 125 can be rotational position sensors. The rotational position sensors can be configured to transform mechanical rotary movements and measurements into electrical signals. The rotational position sensors can be any suitable type of rotational position sensors, now known or later developed. In some instances, the rotational position sensors can be operatively positioned on or within the actuator(s) 120. Thus, when an actuator 120 is activated or deactivated such that it morphs, the morphing of the actuator 120 can act upon the rotational position sensors so as to change their output electrical signals, which can be used to determine changes in a level of lumbar support provided to a seat occupant.

Figure 2:
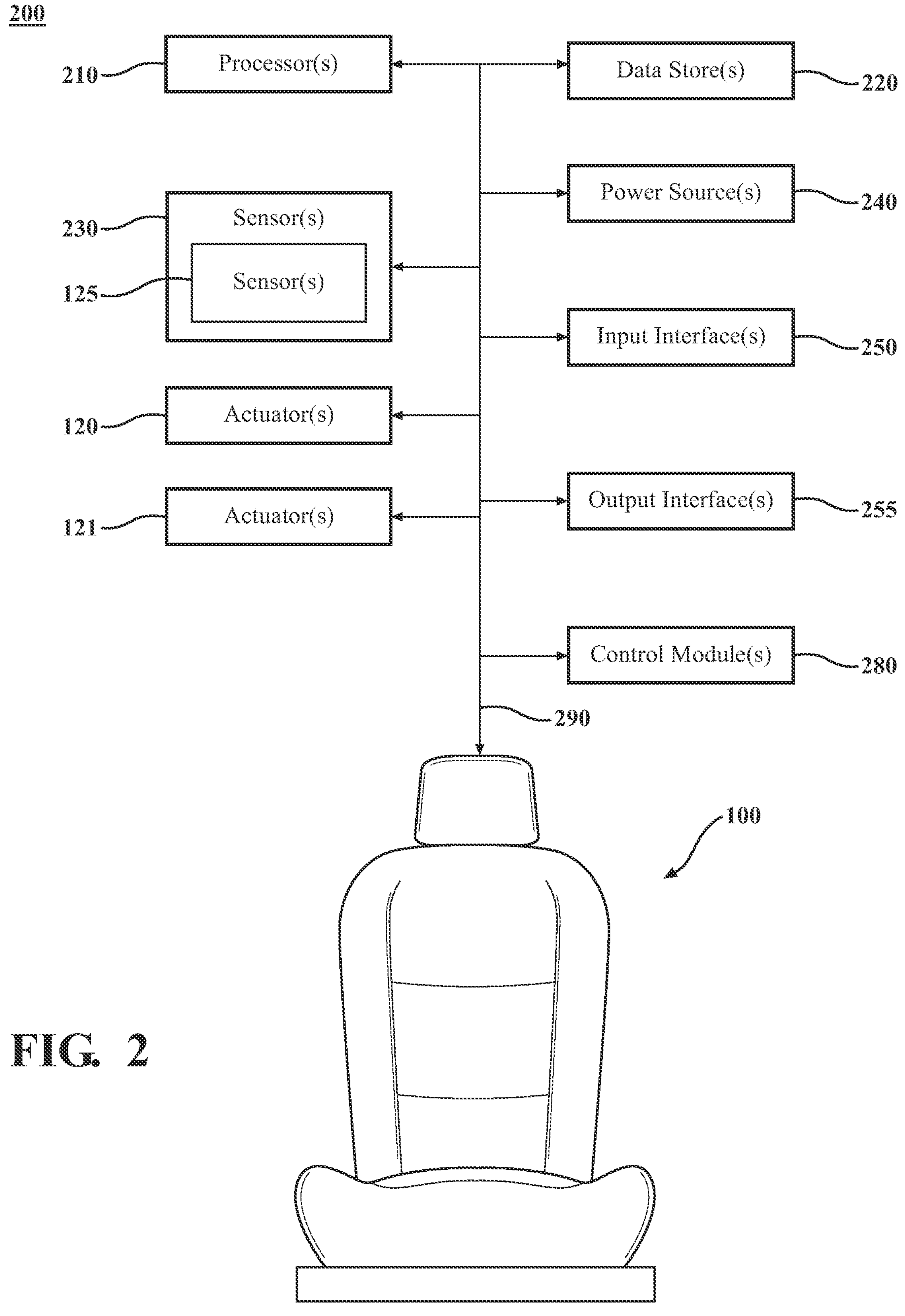
FIG. 2 is an example of a system for actuation of a seat.

Referring to FIG. 2, an example of a system 200 for actuation of the seat 100 is shown. In some arrangements, the system 200 can be used in connection with a vehicle. As used herein, "vehicle" means any form of transport, including motorized or powered transport. In one or more implementations, the vehicle can be an automobile. While arrangements will be described herein with respect to automobiles, it will be understood that embodiments are not limited to automobiles. In some implementations, the vehicle may be a watercraft, an aircraft, spacecraft, or any other form of transport. Moreover, arrangements described herein are not limited to vehicles.

The system 200 can include various elements. Some of the possible elements of the system 200 are shown in FIG. 2 and will now be described. It will be understood that it is not necessary for the system 200 to have all of the elements shown in FIG. 2 or described herein. The system 200 can have any combination of the various elements shown in FIG.

2. Further, the system 200 can have additional elements to those shown in FIG. 2. In some arrangements, the system 200 may not include one or more of the elements shown in FIG. 2. Further, while the various elements may be located on or within a vehicle, it will be understood that one or more of these elements can be located external to the vehicle. Thus, such elements are not located on, within, or otherwise carried by the vehicle. Further, the elements shown may be physically separated by large distances. Indeed, one or more of the elements can be located remote from the vehicle, such as on a remote server or cloud-based server.

In addition to one or more seats 100 and one or more of the actuators 120, the system 200 can include one or more processors 210, one or more data stores 220, one or more sensors 230, one or more power sources 240, one or more input interfaces 250, one or more output interfaces 255, and/or one or more control modules 280. In some arrangements, the system 200 can also include one or more of the actuators 121. Each of these elements will be described in turn below.

As noted above, the system 200 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other.

The system 200 can include one or more data stores 220 for storing one or more types of data. The data store(s) 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 220 can be a component of the processor(s) 210, or the data store(s) 220 can be operatively connected to the processor(s) 210 for use thereby. The term "operatively connected," as used throughout this description, can include direct or indirect connections, including connections without direct physical contact.

In some arrangements, the data store(s) 220 can store one or more actuation profiles. The actuation profiles can include instructions for activating one or more of the actuator(s) 120, one or more of the actuator(s) 121, and/or other actuators in a specified manner. The actuation profiles can include activation patterns, activation sequences, activation zones, activation regions, activation times, activation of individual actuators or groups of actuators, etc. The actuation profiles can be created by an end user, a seat manufacturer, a vehicle manufacturer, or some other entity. In some instances, one or more actuation profiles can be received from a remote source. In some arrangements, one or more actuation profiles can be directed to providing lumbar support to a seat occupant.

The system 200 can include one or more sensors 230. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 200 includes a plurality of sensors 230, the sensors can work independently from each other. Alternatively, two or more of the sensors can work in combination with each other. In such case, the two or more sensors can form a sensor network. The sensor(s) 230 can be operatively connected to the processor(s) 210, the data store(s) 220, and/or other elements of the system 200 (including any of the elements shown in FIG. 1).

The sensor(s) 230 can include the sensor(s) 125 described above. In addition, the sensor(s) 230 can include any suitable type of sensor, now known or later developed, that can acquire information or data about the seat 100 or a seat occupant. For instance, the sensor(s) 230 can include weight sensors, seat position sensors, seat angle sensors, occupant position sensors, occupant presence sensors, etc. In one or more arrangements, the sensor(s) 230 can be used to detect the presence of an occupant in the seat 100.

As noted above, the system 200 can include one or more power sources 240. The power source(s) 240 can be any power source capable of and/or configured to energize the actuator(s) 120, as will be described later. For example, the power source(s) 240 can include one or more batteries, one or more fuel cells, one or more generators, one or more alternators, one or more solar cells, and combinations thereof. The power source(s) 240 can be any suitable source of electrical energy.

The system 200 can include one or more input interfaces 250. An "input interface" includes any device, component, system, element, or arrangement or groups thereof that enable information/data to be entered into a machine. The input interface(s) 250 can receive an input from a vehicle occupant (e.g., a driver or a passenger). Any suitable input interface 250 can be used, including, for example, a keypad, gesture recognition interface, voice recognition interface, display, touch screen, multi-touch screen, button, joystick, mouse, trackball, microphone, and/or combinations thereof.

The system 200 can include one or more output interfaces 255. An "output interface" includes any device, component, system, element or arrangement, or groups thereof that enable information/data to be presented to a vehicle occupant (e.g., a person, a vehicle occupant, etc.). The output interface(s) 255 can present information/data to a vehicle occupant. The output interface(s) 255 can include a display. Alternatively or in addition, the output interface(s) 255 may include an earphone and/or speaker. Some components of the system 200 may serve as both a component of the input interface(s) 250 and a component of the output interface(s) 255.

The system 200 can include one or more modules, at least some of which will be described herein. The modules can be implemented as computer readable program code that, when executed by a processor, implements one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data stores 220 may contain such instructions. In some arrangements, the module(s) can be located remote from the other elements of the system 200.

In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 200 can include one or more control modules 280. The control module(s) 280 can include profiles and logic for controlling the actuators 120. The control module(s) 280 can use profiles, parameters, or settings loaded into the control module(s) 280 and/or stored in the data store(s) 220, such as the actuation profiles. In some arrangements, the control module(s) 280 can be located remotely from the other elements of the system 200, such as on a remote server, a cloud-based server, or an edge server.

The control module(s) 280 can be configured to cause one or more of the actuator(s) 120 and/or the actuator(s) 121 to be activated or deactivated. As used herein, "cause" or "causing" means to make, force, compel, direct, command, instruct, and/or enable an event or action to occur or at least be in a state where such event or action may occur, either in a direct or indirect manner. For instance, the control module(s) 280 can cause the actuator(s) 120 to be selectively activated or deactivated in any suitable manner. For instance, when the actuator(s) 120 include a shape memory material member or other contracting member, the shape memory material member can be heated by the Joule effect by passing electrical current through the shape memory material member. To that end, the control module(s) 280 can be configured to selectively permit, restrict, adjust, alter, and/or prevent the flow of electrical energy from the power source(s) 240 to the one or more shape memory material members of the actuator(s) 120. The control module(s) 280 can be configured to send control signals or commands over a communication network 290 to the shape memory material members or to other elements of the system 200.

The control module(s) 280 can be configured to cause the actuator(s) 120 to be activated or deactivated individually, in one or more groups, or in one or more regions of the seat 100. The control module(s) 280 can be configured to cause the actuator(s) 120 to be activated or deactivated based on various events, conditions, inputs, or other factors. For instance, the control module(s) 280 can be configured to cause the actuator(s) 120 to be activated or deactivated based on a user input. A user can provide an input on the input interface(s) 250. The input can be a command to implement one of the actuation profiles. The input can be a command to activate or deactivate one or more of the actuators 120 based on the previously used actuation profile or a default actuation profile. In some instances, the input can be a newly defined actuation profile. The user can define parameters, profiles, and characteristics for individual actuators 121 or a plurality of actuators 121.

In some arrangements, the control module(s) 280 can be configured to cause the actuator(s) 120 to be activated or deactivated. In some instances, the control module(s) 280 can be configured to adjust the degree of activation of the actuator(s) 120. For instance, the control module(s) 280 can be configured to cause the actuator(s) 120 to be in an activated configuration that corresponds to its full activated position (e.g., extended to its maximum height). The control module(s) 280 can be configured to activate the actuator(s) 120 to one or more activated configurations between the non-activated configuration and the full activated configuration, such as an extended position but less than its maximum height.

In some arrangements, the control module(s) 280 can cause the actuator(s) 120 to be activated to provide a desired level of lumbar support to the seat occupant. Such causing can be performed based on a user input. The control module(s) 280 can be configured to cause the actuator(s) 120 to be morphed into an activated configuration that corresponds to the desired lumbar support.

The control module(s) 280 can be configured to maintain the activated configuration of the actuator(s) 120. Thus, a substantially continuous level of lumbar support can be provided to the seat occupant. The control module(s) 280 can do so in any suitable manner. For instance, the control module(s) 280 can receive sensor data (e.g., from the sensor(s) 125 and/or the sensor(s) 230) about the actuator(s) 120. The control module(s) 280 can be configured to adjust the activated configuration of the actuator(s) 120 based on the sensor data. Adjusting the activated configuration includes increasing or decreasing the level of activation of one or more of the actuator(s) 120 so that the desired level of lumbar support to the seat occupant is substantially maintained. The control module(s) 280 can be configured to analyze data or information acquired by the sensor(s) 230 (e.g., sensors 125 or other sensors) to select an activated configuration that may be suitable for the user. For instance, the control module(s) 280 can be configured to detect changes in resistance using sensor data from the flex sensors. When such changes are detected, the control module(s) 280 can be configured to adjust the activated configuration of the actuator(s) 120 as appropriate so that the desired level of lumbar support is substantially maintained. The control module(s) 280 can be configured to maintain the actuator(s) 120 in an activated configuration such that a force applied to the lumbar region of a seat occupant is maintained.

In some instances, the control module(s) 280 can be configured to selectively activate one or more of the actuator(s) 121 corresponding to non-lumbar regions of the seat 100. The actuator(s) 121 can provide a different sensation to the seat occupant than the actuator(s) 120. For instance, the different sensation can be a massaging effect. In some arrangements, the control module(s) 280 can be configured to simultaneously provide a massaging effect by the actuator(s) 121 and lumbar support by the actuator(s) 120.

The various elements of the system 200 can be communicatively linked to one another or one or more other elements through one or more communication networks 290. As used herein, the term "communicatively linked" can include direct or indirect connections through a communication channel, bus, pathway or another component or system. A "communication network" means one or more components designed to transmit and/or receive information from one source to another. The data store(s) 220 and/or one or more other elements of the system 200 can include and/or execute suitable communication software, which enables the various elements to communicate with each other through the communication network and perform the functions disclosed herein.

The one or more communication networks 290 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Now that the various potential systems, devices, elements and/or components of the system 200 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 3:
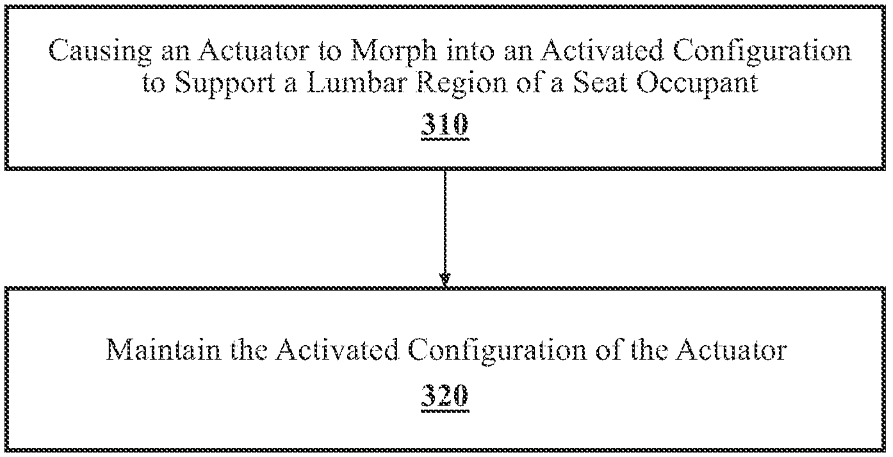
FIG. 3 is an example of a method of seat actuation.

Turning to FIG. 3, an example of a method 300 of seat actuation is shown. As described above, an actuator 120 can be operatively positioned relative to a lumbar region of a seat 100. One or more processors 210 can be operatively connected to the actuator 120. While the method 300 will be described in connection with a single actuator 120, it will be appreciated that the method 300 can be applied to arrangements in which there are a plurality of actuators 120.

At block 310, the actuator 120 can be caused to morph into an activated configuration to support a lumbar region of a seat occupant. Such causing can be performed by the processor(s) 210 and/or the control module(s) 280. For instance, the processor(s) 210 and/or the control module(s) 280 can cause electrical energy from the power source(s) 240 (or energy from any other suitable source) to be supplied to the actuator 120. More particularly, the processor(s) 210 and/or the control module(s) 280 can cause electrical energy from the power source(s) 240 (or energy from any other suitable source) to be supplied to contracting member(s) (e.g., shape memory material member(s), shape memory alloy wire(s), etc.) of the actuator 120. When the actuator 120 morphs into the activated configuration, a dimension (e.g., the height) of the actuator 120 can increase. The causing can be performed automatically, in response to a user input (e.g., provided on the input interface(s) 250), or in any other suitable way. The method 300 can continue to block 320.

At block 320, the activated configuration of the actuator 120 can be maintained. Thus, a substantially continuous level of lumbar support can be provided to the seat occupant. The maintaining of the activated configuration can be performed by the processor(s) 210 and/or the control module(s) 280. The maintaining can include adjusting the activated configuration of the actuator 120. Such adjusting can be performed in real-time based on data acquired by the sensor(s) 230 and/or the sensor(s) 125. The maintaining can include adjusting the activated configuration of the actuator 120 so as to maintain the substantially continuous level of lumbar support. Adjusting the activated configuration can include increasing or decreasing the actuated position or force output of the actuator 120 (or one or more individual actuators 120 when there is a plurality of actuators 120). The increasing or decreasing of the actuated position or force output can be performed by adjusting the supply of electrical energy from the power source(s) 240 (or energy from any other suitable source) to the actuator 120. In some arrangements, the activated configuration can be maintained by keeping the supply of electrical energy (or other form of energy) to the actuator 120 substantially constant.

The method 300 can end. Alternatively, the method 300 can return to block 310 or to some other block. The method 300 can be repeated at any suitable point, such as at a suitable time or upon the occurrence of any suitable event or condition.

Arrangements described herein can be customized by a user. Thus, a user can define a new actuation profile, or the user can modify an existing actuation profile. A user can adjust a currently implemented actuation profile in real-time. Arrangements described herein can enable a user to program individual actuators 120 and/or or a plurality of the actuators 120. Arrangements described herein can enable a user to program individual actuators 121 and/or a plurality of the actuators 121. Such customization can be effectuated in various ways.

Figure 4:
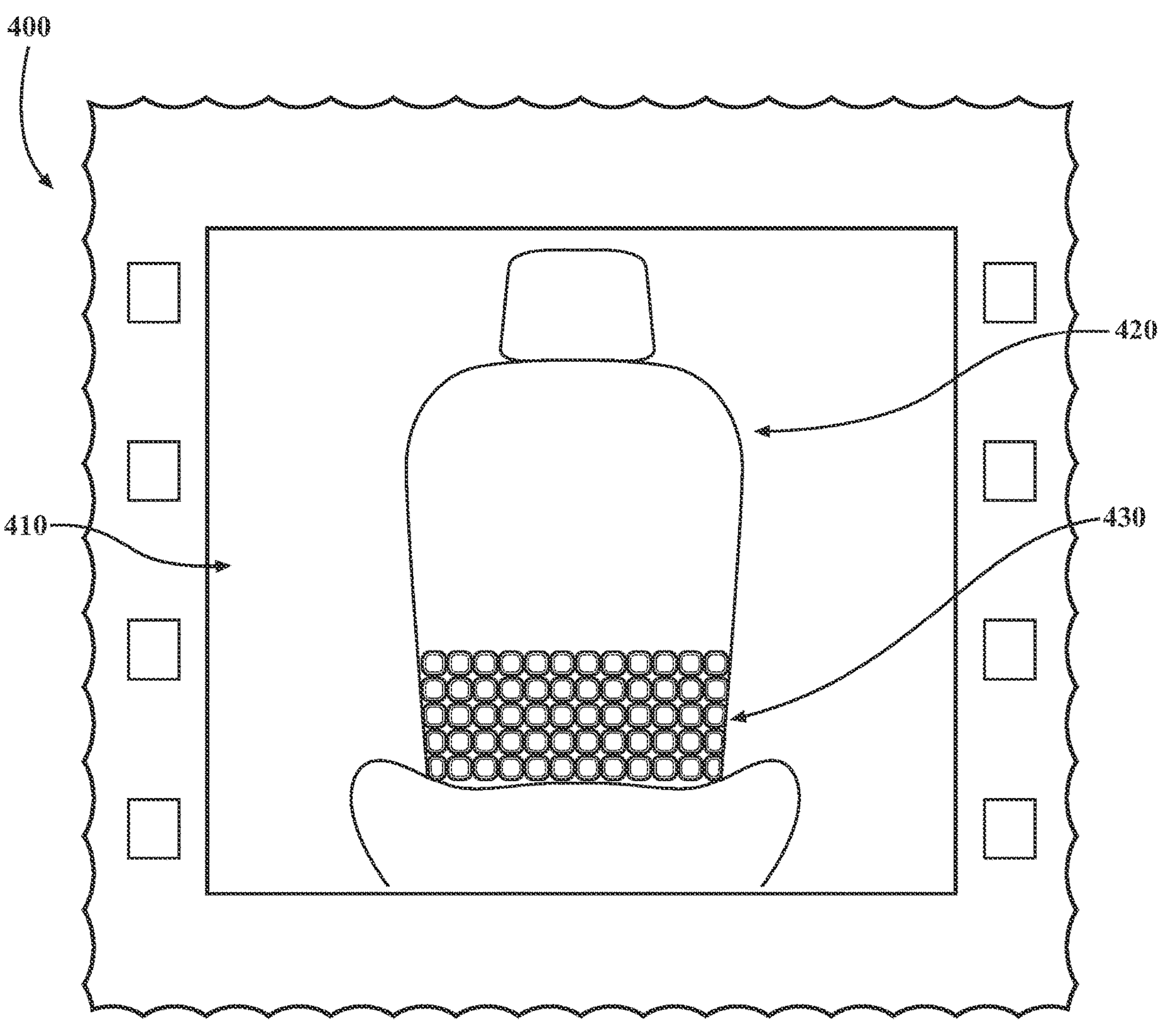
FIG. 4 is an example of a user interface for an actuator.

FIG. 4 shows one example in which a user interface is presented on a display 400. The display can be a part of the output interface(s) 255 and/or the input interface(s) 250 of the system 200. In one or more arrangements, the display 400 can be part of a vehicle infotainment system or head unit of a vehicle. In some arrangements, the display 400 can be a portion of another vehicle system, such as a navigation system, a vehicle radio or audio system, a backup camera display, and/or other vehicle monitor. In one or more arrangements, the display 400 can be located in a front interior portion of the vehicle. For instance, the display 400 can be included in a dashboard or instrument panel of the vehicle. Of course, it will be appreciated that arrangements described herein can be customized using other user interfaces, such as on a portable communication device (e.g., a cellular telephone, a smart phone, etc.), a voice interface, a gesture interface, a computer (e.g., a laptop, a tablet, a phablet, etc.), etc.

The display 400 can be any suitable type of display, now known or later developed. In one or more arrangements, the display 400 can be a touch screen display, which can allow a user to engage or interact with one or more displayed elements, such as a graphical user interface (GUI) 410, and/or other applications running on any vehicle system, including any of those described herein, through contact with the display. For example, a user may make selections and/or move a cursor by simply touching the display 400 via a finger or stylus.

In the example shown in FIG. 4, the GUI 410 can present a representation of at least a portion of the seat 420. A representation of one or more actuators 430 can be presented on the representation of the seat 420. The representation of the one or more actuators 430 can correspond to the location of the actuator(s) (e.g., actuator(s) 120) associated with the seat (e.g., seat 100) of the vehicle. The GUI 410 can be presented automatically whenever the actuators are in use, when requested by a user, or upon some other condition or event.

In some arrangements, the GUI 410 can be configured to present a currently in use activation profile. The GUI 410 can show which of the actuator(s) are activated, such as by highlighting them. The GUI 410 can be updated in real time to show changes in the actuator(s). Additional or alternative effects can be used to represent a status or condition of the actuator(s).

In some arrangements, the GUI 410 can allow a user to define a new activation profile and/or modify an existing activation profile. The GUI 410 can allow a user to select all of the actuator(s), individual actuator(s), a plurality of actuators, one or more rows of actuators, one or more columns of actuators, one or more regions of actuators, any other subset of the actuators, or any combination thereof. When a selection of one or more actuators is made, a user can assign one or more settings, conditions, parameters, or attributes for the selected actuators. The settings can include activation time, activation duration, activation patterns (e.g., pulses), activation strength, activation speed, activation degree, activation sequence, other activation settings, and any combination thereof. The user inputs can be saved as an actuation profile.

In some instances, the GUI 410 can present a suggested activation profile to a user. The user can try the actuation profile, decline the activation profile, or modify the actuation profile. The actuation profile can be saved to the data store(s) 220.

In this example, the actuators are shown in a portion of the seat corresponding to the lumbar region 113 of the seat. However, it will be appreciated that the arrangements described herein are not limited in this regard. Indeed, the GUI 410 can represent actuators in other areas of the representation of the seat, such as in other portions of the back, the headrest, seat portion, bolster(s), arm rest(s), or any other portion of the seat. The GUI 410 can allow a user to select other areas of the seat. It will be appreciated that an actuation profile can cover one or more areas of the seat. For instance, a user can create an actuation profile that includes constant activation in the lumbar region while simultaneously providing a massaging effect in other areas of the user's body.

As noted above, there can be a single actuator 120 or a plurality of actuators 120. When there is a plurality of actuators, the actuators can be substantially identical to each other. Alternatively, one or more of the actuators can be different from the other actuators in one or more respects. FIGS. 5-8 show some non-limiting examples of suitable actuators.

Figure 5A:
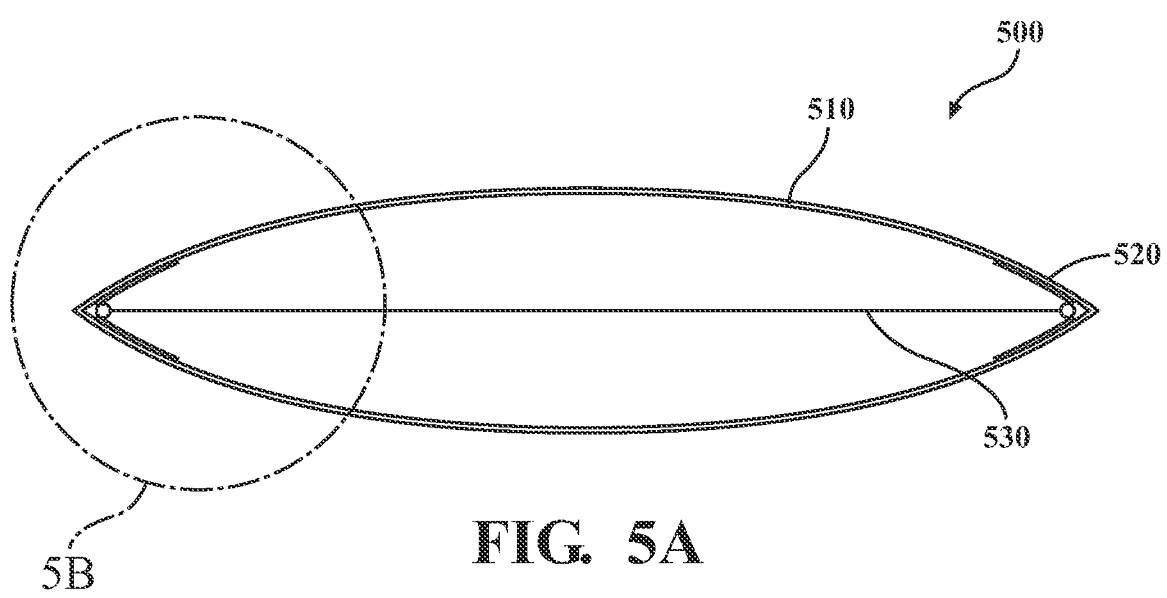
FIG. 5A-5C is a first example of an actuator.
Figure 5B:
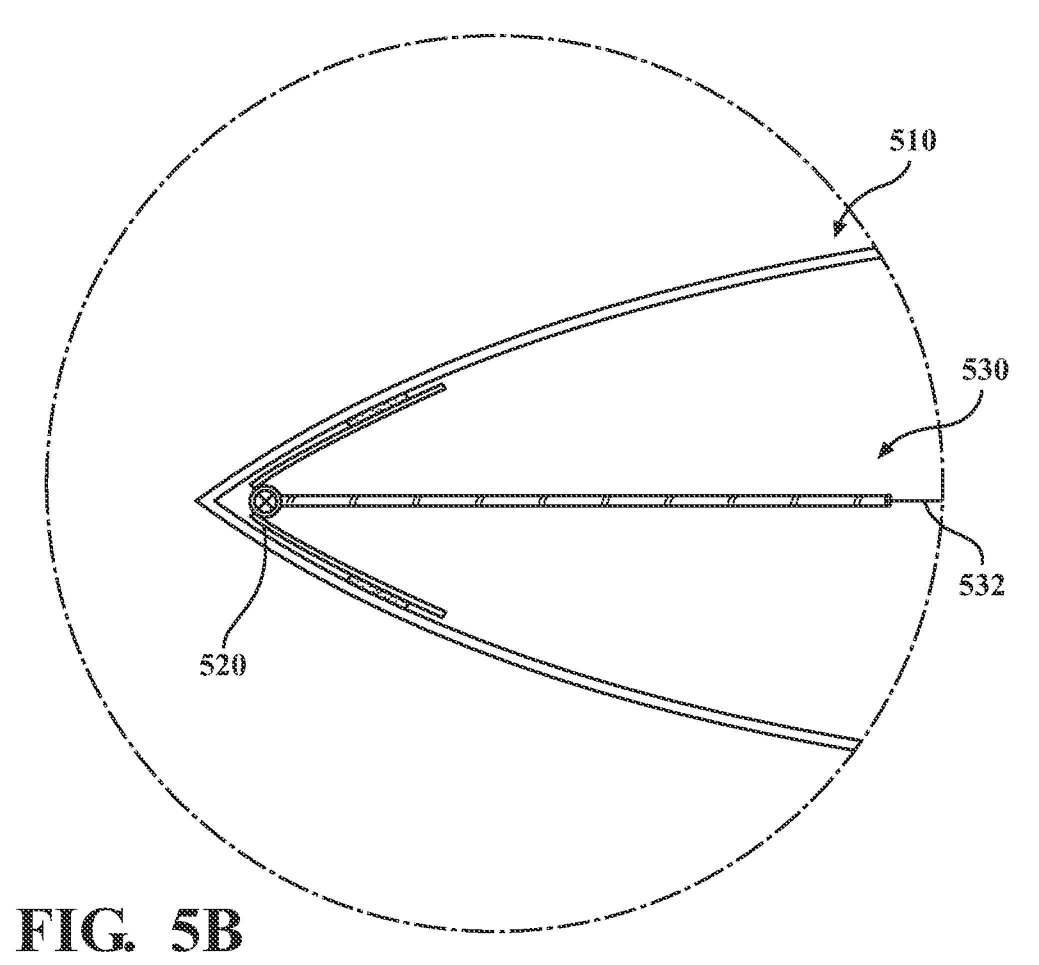
Figure 5C:
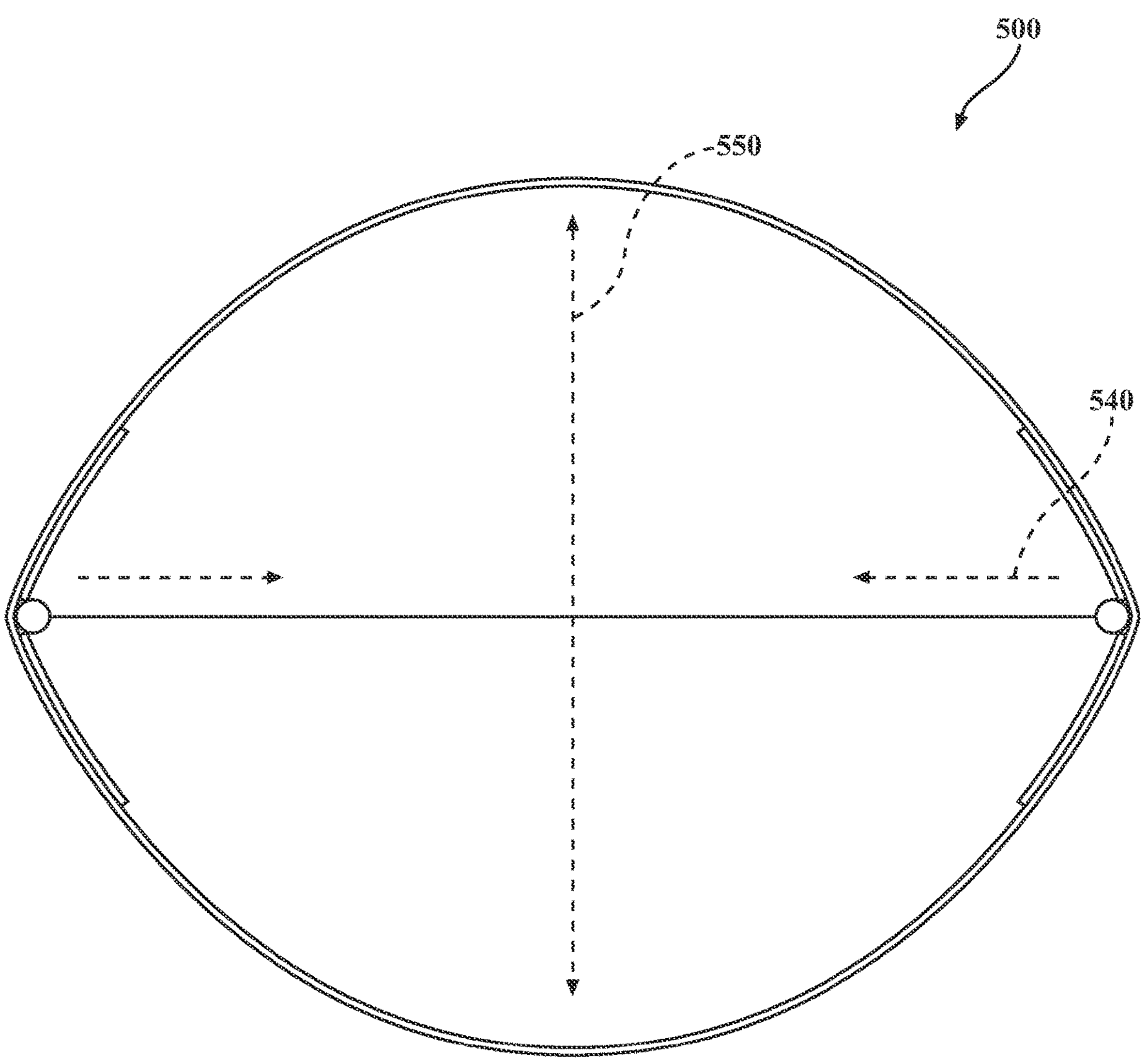

FIGS. 5A-5C show one example of an actuator 500 suitable for use in connection with arrangements described herein. The basic details of the actuator 500 will now be described. Additional details of the actuator 500 are described in U.S. Pat. No. 10,960,793, which is incorporated herein by reference in its entirety.

The actuator 500 is depicted here with an outer skin 510, hinge assemblies 520, and an input-responsive element 530. The actuator 500 can have a first dimension 540 and a second dimension 550.

The input-responsive element 530 can include one or more elements capable of transitioning from a first configuration to a second configuration. The transition of the input-responsive element 530 from the first configuration to the second configuration displaces the hinge assemblies 520 with respect to the outer skin 510 and causes a change in conformation of the outer skin 510. In some implementations, the input-responsive element 530 can include a SMM wire 532. The SMM wire 532 can be a shape memory alloy.

FIG. 5A shows an example of the actuator 500 in a non-activated configuration. When heated, the SMM wire 532 can contract, causing the hinge assemblies 520 to move toward one another. As a result, the actuator 500 can morph from a non-activated configuration to an activated configuration as shown in FIG. 5C. In the activated configuration, the second dimension 550 of the actuator can increase, and the first dimension 540 of the actuator 500 can decrease.

Figures 6A, 6B:
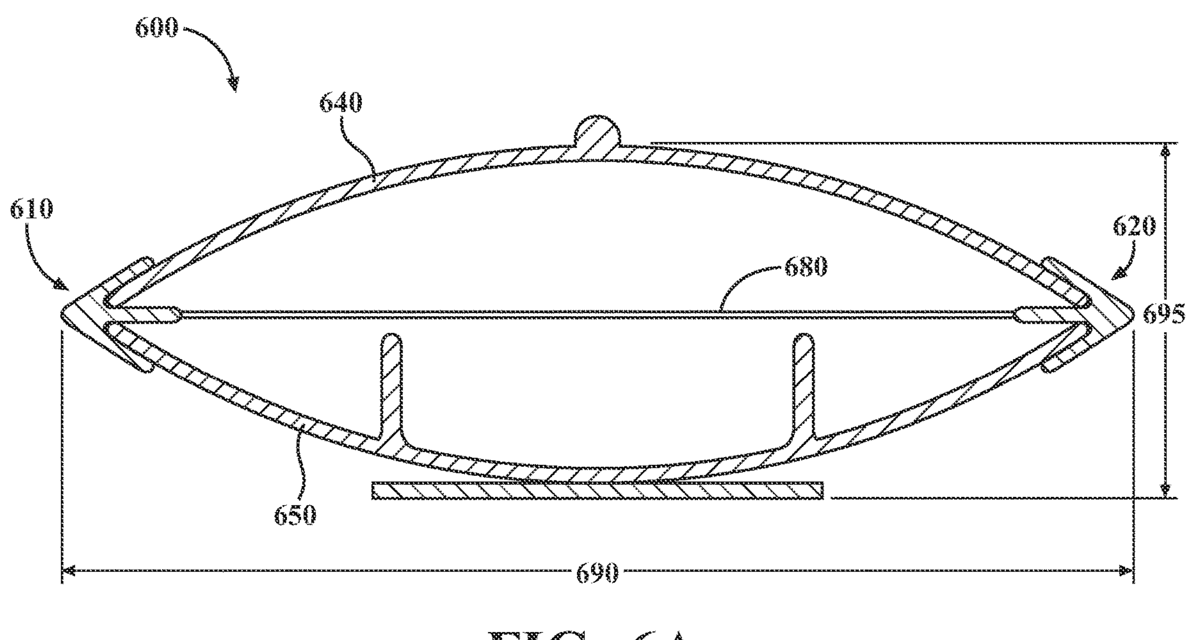
FIGS. 6A-6B is a second example of an actuator.

FIGS. 6A-6B show another example of an actuator 600 suitable for use in connection with arrangements described herein. The basic details of the actuator 600 will now be described. Additional details of the actuator 600 are described in U.S. patent application Ser. No. 17/729,522, which is incorporated herein by reference. FIG. 6A shows an example of the actuator 600 in a non-activated condition, and FIG. 6B shows an example of the actuator 600 in an activated condition.

The actuator 600 can include a first endcap 610 and a second endcap 620. The first endcap 610 and the second endcap 620 can be spaced apart. The actuator 600 can include a first outer member 640 and a second outer member 650. The first outer member 640 and the second outer member 650 can have a bowed shape.

The actuator 600 can include one or more shape memory material members 680. The shape memory material members 680 can be operatively connected to the first endcap 610 and the second endcap 620. The phrase "shape memory material" includes materials that change shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 680 can be shape memory material wires. As an example, the shape memory material members 680 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

As noted above, FIG. 6B is an example of the actuator 600 in an activated condition. When an activation input (e.g., electrical energy) is provided to the shape memory material member(s) 680, the shape memory material member(s) 680 can contract. This contraction causes the shape memory material member(s) 680 to pull the first endcap 610 and the second endcap 620 toward each other in a direction that corresponds to the first dimension 690.

Consequently, the ends of the first outer member 640 can be drawn toward each other in a direction that corresponds to the first dimension 690, and the ends of the second outer member 650 can be drawn toward each other in a direction that corresponds to the first dimension 690. As a result, the first outer member 640 and the second outer member 650 can bow outward and away from each other in a direction that corresponds to the second dimension 695. It will be appreciated that the first dimension 690 (i.e., the width) of the actuator 600 can decrease, and the second dimension 695 (i.e., the height) of the actuator 600 can increase.

Figure 7A:
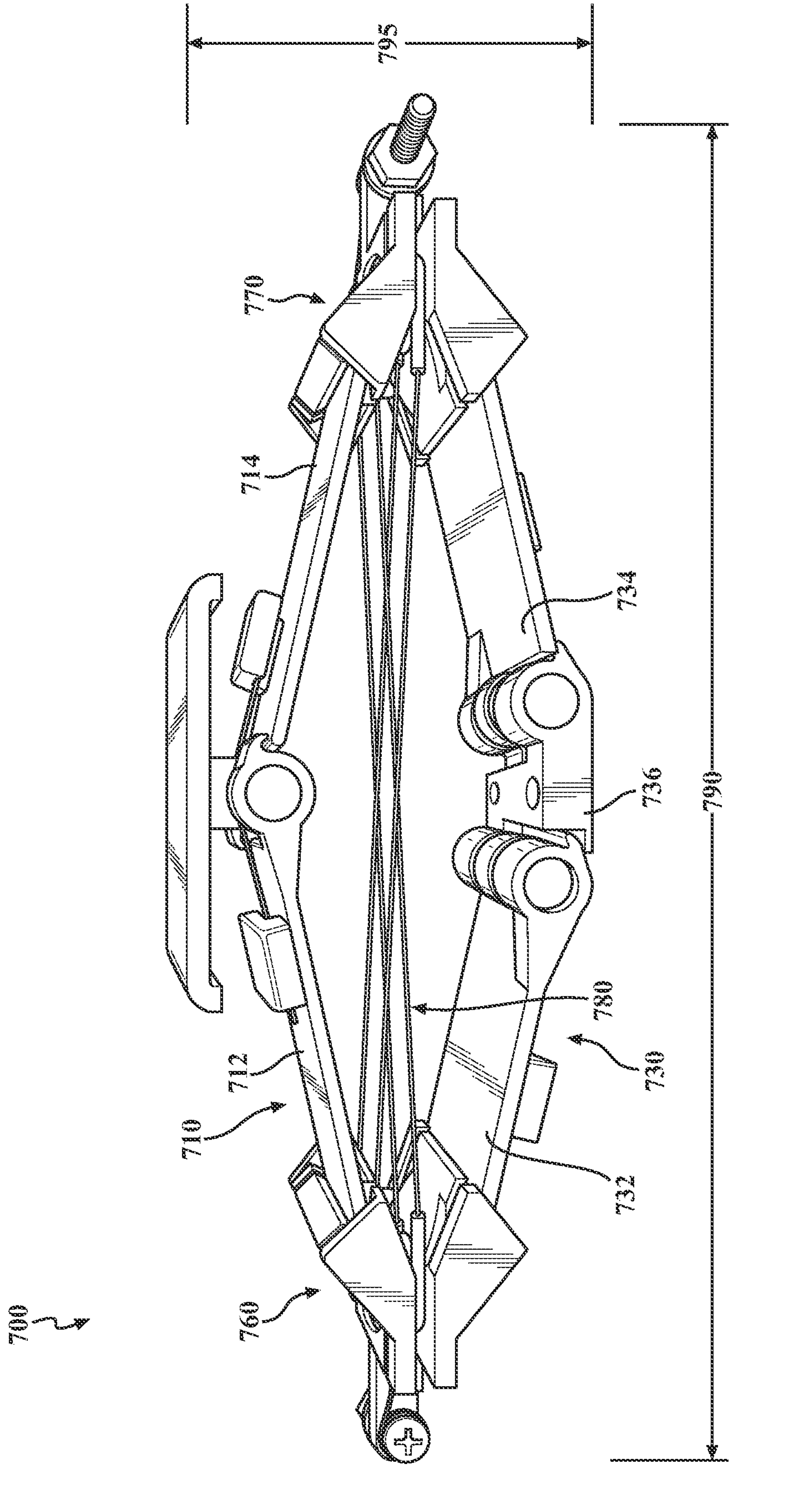
FIGS. 7A-7B is a third example of an actuator.
Figure 7B:
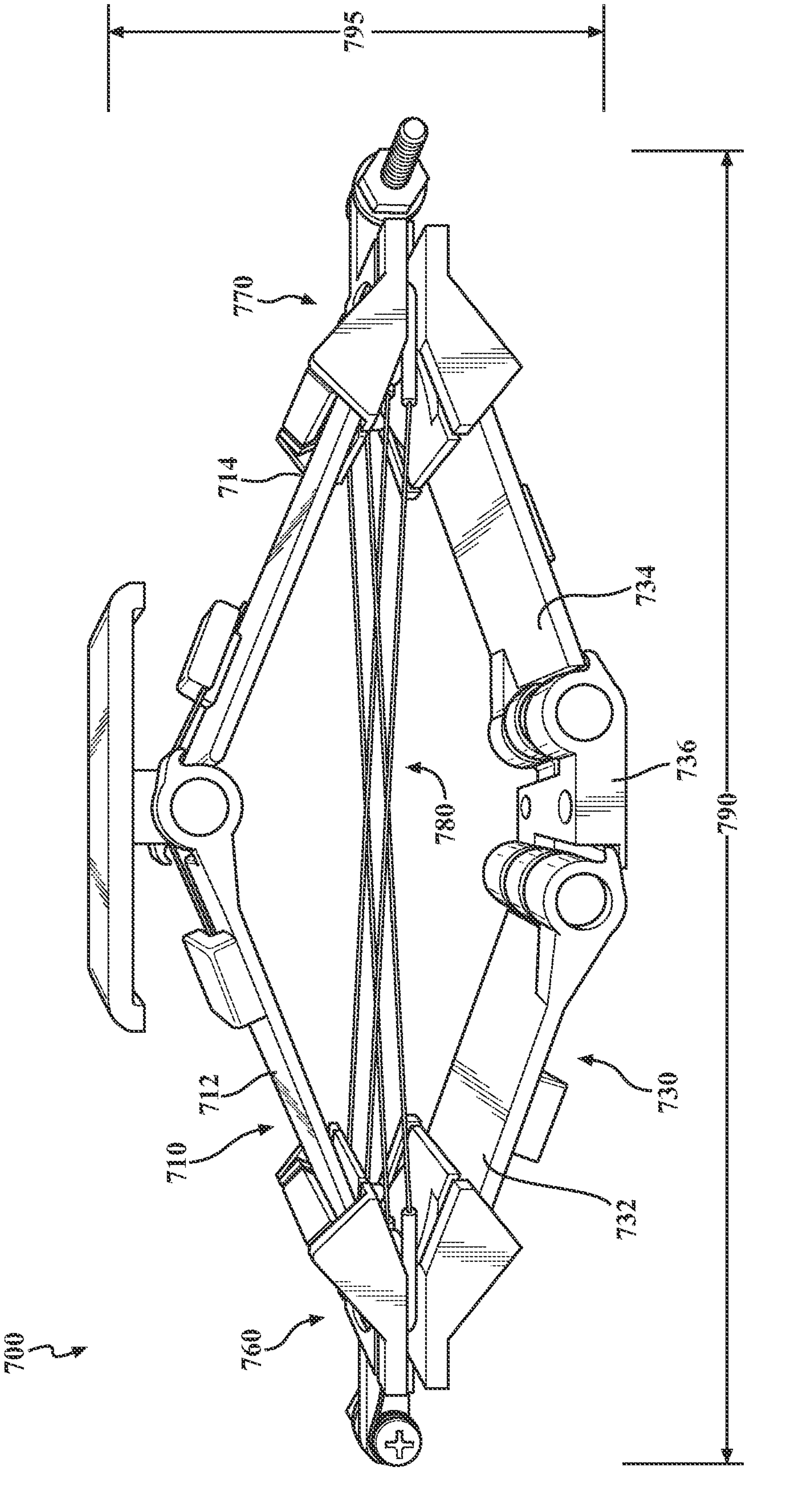
Figure 8:
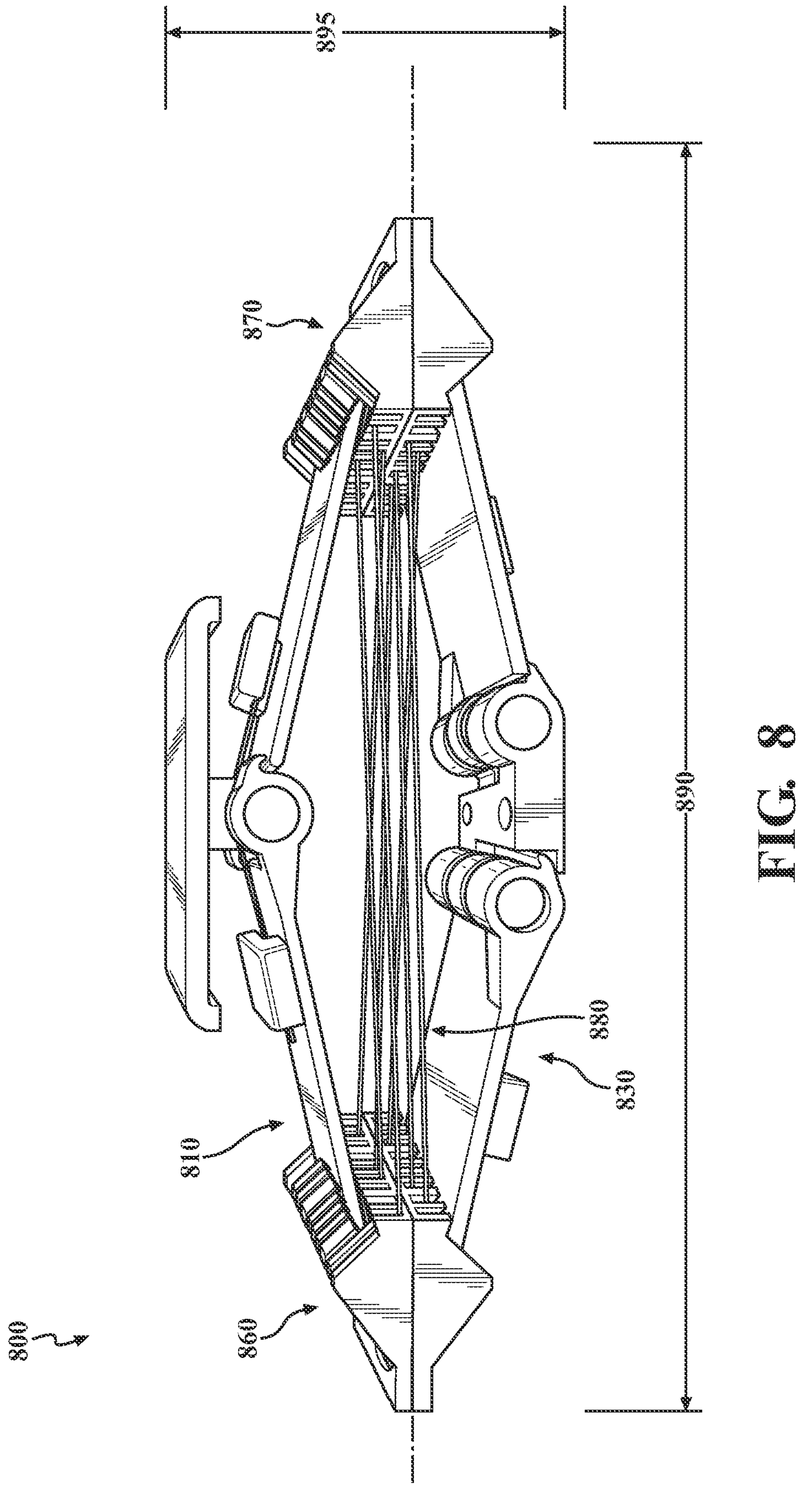
FIG. 8 is a fourth example of an actuator.

FIGS. 7A-7B show one example of an actuator 700 suitable for use according to arrangements herein. The basic details of the actuator 700 will now be described. Additional details of the actuator 700 are described in U.S. patent application Ser. No. 18/329,217, which is incorporated herein by reference.

The actuator 700 can include a first outer body member 710, a second outer body member 730, a first endcap 760, a second endcap 770, and a shape memory material member 780. The first outer body member 710 can include a first portion 712 and a second portion 714. The first portion 712 and the second portion 714 can be operatively connected to each other such that the first portion 712 and the second portion 714 can move relative to each other. In one or more arrangements, the first portion 712 and the second portion 714 can be pivotably connected to each other. For example, the first portion 712 and the second portion 714 can be pivotably connected to each other by one or more hinges. The first portion 712 and the second portion 714 can be angled relative to each other. As a result, the first outer body member 710 can be generally V-shaped.

The second outer body member 730 can include a first portion 732, a second portion 734, and a base 736. In one or more arrangements, each of the first portion 732 and the second portion 734 can be pivotably connected to the base 736. For example, the first portion 732 can be pivotably connected to the base 736 by one or more hinges, and the second portion 734 can be pivotably connected to the base 736 by one or more hinges. The first portion 732 and the second portion 734 can be located on opposite sides of the base 736.

The actuator 700 can include a first endcap 760 and a second endcap 770. The first endcap 760 and the second endcap 770 can be spaced apart. The actuator 700 can include one or more shape memory material members 780. The shape memory material member(s) 780 can extend between the first endcap 760 and the second endcap 770 in any suitable manner. The shape memory material member(s) 780 can be operatively connected to the first endcap 760 and the second endcap 770.

FIG. 7A shows an example of the actuator 700 in a non-activated configuration. Here, the shape memory material member(s) 780 are not activated. FIG. 7B shows an example of the actuator 700 in an activated configuration. When an activation input (e.g., electrical energy) is provided to the shape memory material member(s) 780, the shape memory material member(s) 780 can contract. This contraction causes the shape memory material member(s) 780 to pull the first endcap 760 and the second endcap 770 toward each other in a direction that corresponds to a first dimension 790. As a result, the first outer body member 710 and the second outer body member 730 can extend outward and away from each other in a direction that corresponds to a second dimension 795. It will be appreciated that, in going from the non-activated condition to the activated condition, the first dimension 790 (i.e., the width) of the actuator 700 can decrease and/or the second dimension 795 (i.e., the height) of the actuator 700 can increase. Further, it will be appreciated that the actuator 700 can deliver a force in a direction that is out of plane or otherwise different from the direction of contraction of the shape memory material member(s) 780.

FIG. 8 shows one example of an actuator 800 suitable for use according to arrangements herein. The basic details of the actuator 800 will now be described. Additional details of the actuator 800 are described in U.S. patent application Ser. No. 18/329,217, which is incorporated herein by reference.

The actuator 800 can include a first outer body member 810, a second outer body member 830, and one or more shape memory material members 880. The actuator 800 includes a first endcap 860 and a second endcap 870. The first endcap 860 and the second endcap 870 shown in FIG. 8 are different from the first endcap 760 and the second endcap 770 shown in FIGS. 7A-7B.

FIG. 8 shows an example of the actuator 800 in a non-activated configuration. Here, the shape memory material member(s) 880 are not activated. When an activation input (e.g., electrical energy) is provided to the shape memory material member(s) 880, the shape memory material member(s) 880 can contract. This contraction causes the shape memory material member(s) 880 to pull the first endcap 860 and the second endcap 870 toward each other in a direction that corresponds to the first dimension 890. As a result, the first outer body member 810 and the second outer body member 830 can extend outward and away from each other in a direction that corresponds to the second dimension 895. It will be appreciated that, in going from the non-activated condition to the activated condition, the first dimension 890 (i.e., the width) of the actuator 800 can decrease and/or the second dimension 895 (i.e., the height) of the actuator 800 can increase.

The various examples of actuators shown in FIGS. 5-8 are merely examples and are not intended to be limiting. Other actuators are described in U.S. Patent Publication Nos. 2023/0191953 and 2023/0136197 as well as U.S. Pat. Nos. 11,370,330; 11,285,844; and 11,091,060, which are incorporated herein by reference in their entireties.

It will be appreciated that arrangements described herein can provide numerous benefits, including one or more of the benefits mentioned herein. For example, arrangements described herein can provide support to the lumbar region of a seat occupant's back. Arrangements described herein can provide a different actuation effect (e.g., massaging) to other areas of a seat occupant's body simultaneously with providing lumbar support. Arrangements described herein can provide an enhanced haptic effect. Arrangements described herein can provide sensor feedback loops to monitor the performance of the actuators and the seat. Arrangements described herein can enable a high degree of customization and/or programmability to a user.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A system for seat actuation comprising:

a seat;

an actuator operatively positioned relative to a lumbar region of the seat, the actuator being a single actuator; and a processor operatively connected to the actuator, the processor being configured to:

cause the actuator to morph into an activated configuration to support a lumbar region of a seat occupant; and adjust the activated configuration of the actuator to a plurality of activated positions during a period of time so that a displacement of the actuator changes while a substantially continuous level of lumbar support is provided to the seat occupant during the entire period of time, whereby a substantially continuous force is applied to the lumbar region of the seat occupant during the entire period of time.

2. The system of claim 1, wherein the actuator is located within the seat.

3. The system of claim 1, wherein the causing the actuator to morph into the activated configuration to support the lumbar region of the seat occupant is performed responsive to a user input.

4. The system of claim 1, wherein a height of the actuator increases when the morphing into the activated configuration is caused.

5. The system of claim 1, wherein the causing the actuator to morph into the activated configuration to support the lumbar region of the seat occupant is performed automatically by the processor.

6. The system of claim 1, wherein the seat is located onboard a vehicle.

7. The system of claim 1, further including a second actuator, wherein the second actuator is operatively positioned with respect to one or more non-lumbar regions of the seat, and wherein the processor is further configured to activate the second actuator to provide a massaging effect to the seat occupant, whereby the massaging effect and the lumbar support are provided simultaneously.

8. The system of claim 1, wherein the actuator includes a contracting member, wherein, when an activation input is provided to the contracting member, the contracting member contracts, thereby causing the actuator to morph into the activated configuration.

9. The system of claim 8, wherein the contracting member is a shape memory material member.

10. The system of claim 9, wherein the shape memory material member is a shape memory alloy wire.

11. The system of claim 1, further including a sensor operatively connected to the processor, wherein the sensor is operatively positioned to acquire sensor data about the actuator, and wherein the processor is configured to adjust the activated configuration of the actuator based on the sensor data.

12. The system of claim 11, wherein the sensor is a flexing sensor or a rotational position sensor.

13. The system of claim 1, wherein the actuator is a first actuator, and further including a second actuator operatively positioned relative to the lumbar region of the seat, wherein the second actuator is a single second actuator, wherein the processor is operatively connected to the second actuator, the processor being configured to:

cause the second actuator to morph into an activated configuration to support the lumbar region of the seat occupant; and adjust the activated configuration of the second actuator to a plurality of activated positions during the period of time so that a displacement of the second actuator changes while a substantially continuous level of lumbar support is provided to the seat occupant by the second actuator during the entire period of time, whereby a substantially continuous force is applied to the lumbar region of the seat occupant during the entire period of time by the second actuator.

14. A method of seat actuation for lumbar support, wherein an actuator is operatively positioned relative to a lumbar region of a seat, wherein the actuator is a single actuator, wherein a processor is operatively connected to the actuator, the method comprising:

causing the actuator to morph into an activated configuration to support a lumbar region of a seat occupant; and adjusting the activated configuration of the actuator to a plurality of activated positions during a period of time so that a displacement of the actuator changes while a substantially continuous level of lumbar support is provided to the seat occupant during the entire period of time, whereby a substantially continuous force is applied to the lumbar region of the seat occupant during the entire period of time.

15. The method of claim 14, wherein the adjusting the activated configuration of the actuator includes:

acquiring sensor data about the actuator; and adjusting the activated configuration of the actuator based on the sensor data.

16. The method of claim 14, wherein the actuator is a first actuator, and further including a second actuator operatively positioned relative to a non-lumbar region of the seat, the method further including:

causing the second actuator to be activated, the second actuator providing a different sensation to the seat occupant than the first actuator.

17. The method of claim 16, wherein the different sensation is a massaging effect.

18. The method of claim 14, wherein the causing the actuator to morph into the activated configuration to support the lumbar region of the seat occupant is performed responsive to a user input.

19. The method of claim 14, wherein the actuator includes a contracting member, and wherein the causing the actuator to morph into the activated configuration to support the lumbar region of the seat occupant includes providing an activation input to the contracting member of the actuator.

* * * * *